(12) United States Patent
Chiu

(10) Patent No.: US 6,382,563 B1
(45) Date of Patent: May 7, 2002

(54) AIRCRAFT WITH SEVERABLE BODY AND INDEPENDENT PASSENGER CABINS

(76) Inventor: Chui-Wen Chiu, 9 Nordic Place, North York, Toronto Ontario (CA), M3A 2H8

( * ) Notice: Subject to any disclaimer, the term of this patent is extended or adjusted under 35 U.S.C. 154(b) by 0 days.

(21) Appl. No.: 09/467,790

(22) Filed: Dec. 20, 1999

(51) Int. Cl.[7] .......................... B64C 1/32; B64D 25/115
(52) U.S. Cl. ...................................... 244/120; 244/140
(58) Field of Search .............................. 244/118.5, 120, 244/139, 140

(56) References Cited

U.S. PATENT DOCUMENTS

| | | | | |
|---|---|---|---|---|
| 2,684,219 A | * | 7/1954 | Thunbo | 244/140 |
| 3,508,727 A | * | 4/1970 | Willems | 244/140 |
| 4,699,336 A | * | 10/1987 | Diamond | 244/140 |
| 5,356,097 A | * | 10/1994 | Chalupa | 244/139 |
| 5,921,504 A | * | 7/1999 | Elizondo | 244/140 |

* cited by examiner

Primary Examiner—Robert P. Swiatek

(57) ABSTRACT

An airplane has an outer shell with a plurality of individual passenger cabins slidably located with it in a tandem manner. The outer shell is severable at a predetermined breakable location by various methods. The outer shell is severable with control explosion devices mounted in a front mounting ring and rear mounting located at the breakable location. It may be severable with a high speed cutting mechanism or a laser cutting knife. The passenger cabins are provided with independent oxygen supply, heating, a heat protective shield, deployable parachutes, descending speed control propulsion jets for landing them safely onto the ground after they have separated from the main body in an air accident. Inflatable rafts are provided on each passenger cabin to support the cabins if it lands on water. The passenger cabins have sealing doors which automatically shut the individual passenger cabin when it separates from the main body.

11 Claims, 22 Drawing Sheets

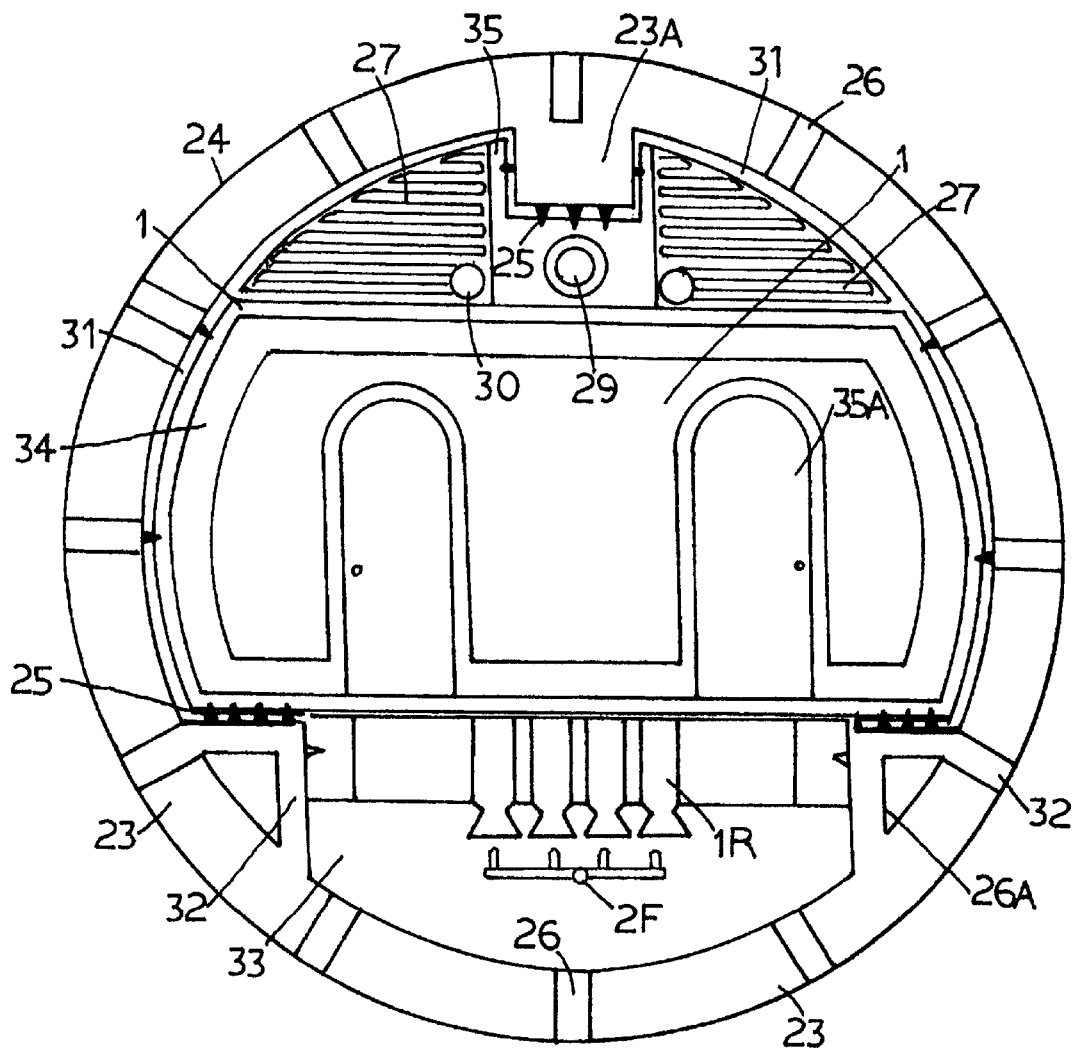
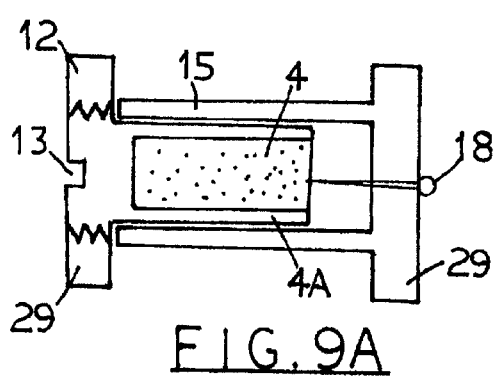
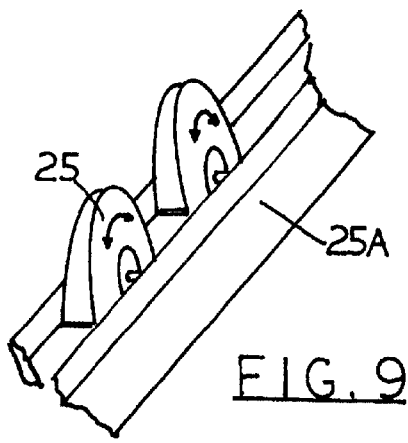
FIG. 8
FIG. 9A
FIG. 9

AIRCRAFT WITH SEVERABLE BODY AND INDEPENDENT PASSENGER CABINS

FIELD OF INVENTION

This invention relates to an airplane construction which can be lives of the passengers in case of an air accident

BACKGROUND OF THE INVENTION

When a heavy passenger airplane loses power or having other flight difficulties, the consequences would be the crash of the airplane to the ground. It does not require much descriptive account from the passengers involved in such air crash for any one to realize the horrific outcome of such air crash. The fear of the potential happening of an air accident by the tens of thousands of air travellers daily and the worry imposed on their families and acquaintances are phenomenal. This is the drawback of the present passenger planes and it imposes great pressure on the nerves of a vast number of air travellers.

There have been great advances in the construction of airplane since its invention, which are the result of the phenomenal advancement in the technologies and knowledge in airplane engine, metal material, electronic communication, meteorology, and airport design. A modern airplane is a culmination of the development of airplane engine, metal alloy, various component parts, and even the airplane paint. Thus, the modem-airplane building industry can truly provide superb high speed airplanes for transporting hundreds of passengers. However, thus far, in fact, the industry can not provide a safe airplane which is completely devoid of crash accident, resistant to adverse weather conditions or destruction due to bombs planted in the plane by a terrorist or attach by rockets. It has been argued that the airplane accident rate is extremely low; however, for every air passenger regardless of man, woman or child, everyone can not escape having bad feeling about the potential danger of death in air travel. In the event of an accident, all the passengers can do to lessen the chance of death is by clutching the pillow, tightening the safety belt, holding their head against the back of the seat in front with their arms, and awaiting the plane weighing hundreds of tons to crash onto to the ground.

In the beginning of the airplane building industry, there was the difficulty in providing suitable support to the tires of the plane son as to withstand the tremendous shock during landing. Plane builders posted large rewards for any solution of such problem in order to gain an edge in the plane building market. In the first and second world wars, each side invested great efforts and money in the development of war planes ranging from the Wild Horse, Type Zero, B29 to the jet plane. After the war, large investments were made to advance the technology, and efforts were made to develop economically profitable commercial airplanes such as the B52 and 747. In the last century, emphasis has been made in the commercial airplane design for reducing the occurrence of air accident so as to eliminate completely accidents such as the Transworld Flight 800, Swiss Airline Flight 111, and Egypt Airline Flight 990 in which all passengers perished.

SUMMARY OF THE INVENTION

It is the principal object of the present invention to provide an airplane construction in which the plane body and the passenger cabins are separable.

It is another object of the present invention to provide an airplane construction in which the plane body may be severable safely at a predetermined joint to facilitate the separation of the independent passenger cabins from the distressed plane.

It is another object of the present invention to provide an airplane construction in which the independent passenger cabins are provided with parachutes, descending speed control propulsion jets and floating raft, for them to safely descend and land onto the ground or water.

It is another object of the present invention to provide protective means, sealing means, air venting and heating means, oxygen supply, and air pressure control in each independent passenger cabin which become operative after the cabin has separated from the distressed plane.

The principle of the invention is based on the concept that the airplane must be designed with a main body shell which may be severed within a split moment so as to enable separate cabins housing the passengers to break away from the plane. The final decision to separate the passenger cabins from the plane must be made by the pilot with consultation from the flight controller and the controlling computer program so that the pilot, the flight attendants and the passengers could escape the otherwise imminent death with the plane.

In order to provide the ultimate solution to the design for eliminating total fatality in an air accident, the design must provide (1) The plane is an independent outer shell construction which may be severed automatically at various selected locations or joints upon occurrence of air accident by propulsion jets and air actuated spring locks; electromagnetic couplings, automatic fixed speed cutting means, or laser cutting means; (2) freely movable and separable passenger cabins located within the outer shell of the plane. The passenger cabins are coupled together with an umbilical construction by sharing common controls and additionally each of which is independently provided with quick action safety sealing doors, parachutes, speed reducing propulsion jets, and safety floatation air bags, all of which operate after the passenger cabins have separated from the plane; and (3) an exit door is provided at the tail end through which the passenger cabins may exit from the plane body.

The passenger cabin either in the form of a single large cabin or a plurality of independent cabins is separated by sliding away from the body of the plane with the provision of a plurality of rollers. Braking means similar to the ABS system used in an automobile may be employed to control the separation sliding speed with sufficient pushing force so that proper distances are maintained between the separate passenger cabins after they have departed from the plane body. Shock absorbers are provided such that the passengers may safely remain in their seats during this operation without panic. If the cabin lands on water, the inflatable raft is each cabin will inflate automatically to maintain the cabin afloat so as to await for rescue.

BRIEF DESCRIPTION OF THE DRAWINGS

FIG. 8 is a sectional view along section line C—C in FIG. 2 showing the structure between the passenger cabin and the outer plane main body shell.

FIG. 9 is an isolated perspective elevation view of the rollers provided on the plane main body to facilitate the passenger cabin from sliding away from the plane.

FIG. 9A is an isolated side elevation view of the rocket fuel tube provided in the locking ring.

DETAILED DESCRIPTION OF THE PREFERRED EMBODIMENTS

Figure 1:
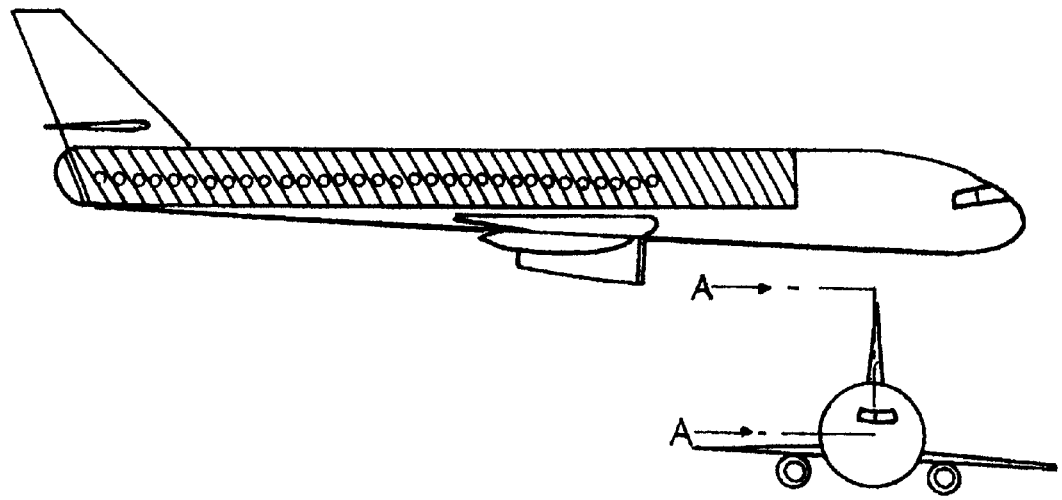
FIG. 1 shows both the side and front elevation views of the airplane according to the present invention.
Figure 2:
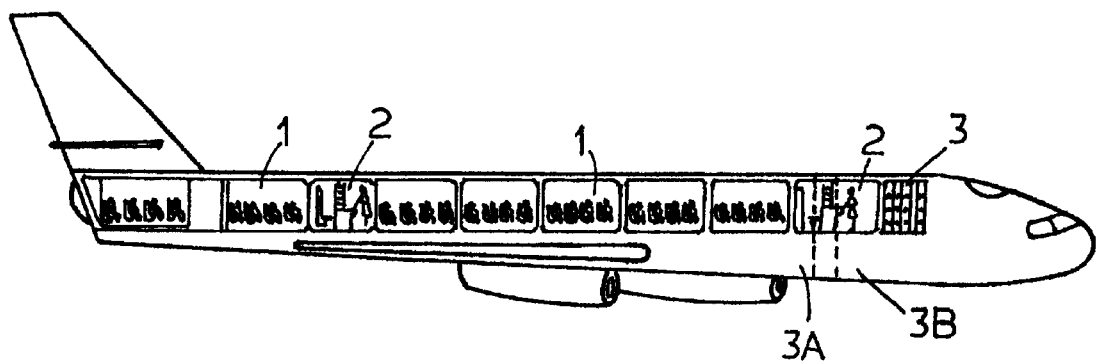
FIG. 2 is a side elevation cut view of the airplane showing the separate passenger cabins located within the outer body shell of the airplane.

With reference to FIGS. 1 and 2, a plurality of individual passenger cabins 1 and food preparation cabins 2 are located in an outer shell 23 of the plane's main body 10 according to the present invention. Normally, the separate cabins are in communication with one another, but in an accident, each cabin may be cut off separately to sever its relationship to the control harness with the closing of the sealing door of each cabin which may then be separated individually from the main body of the plane. A shock absorbing mechanism 3 is located at a joint between a front separable ring 3B mounted at the rear of the front portion 9 of the plane and a rear separable ring 3A mounted at the front end of the outer shell 23. The joint is preferably located in front of the engines at the wings and the front landing wheels. The circular front and rear separable rings 3A and 3B are locked together in fabrication and they may be unlocked when separation is required.

Figure 3B:
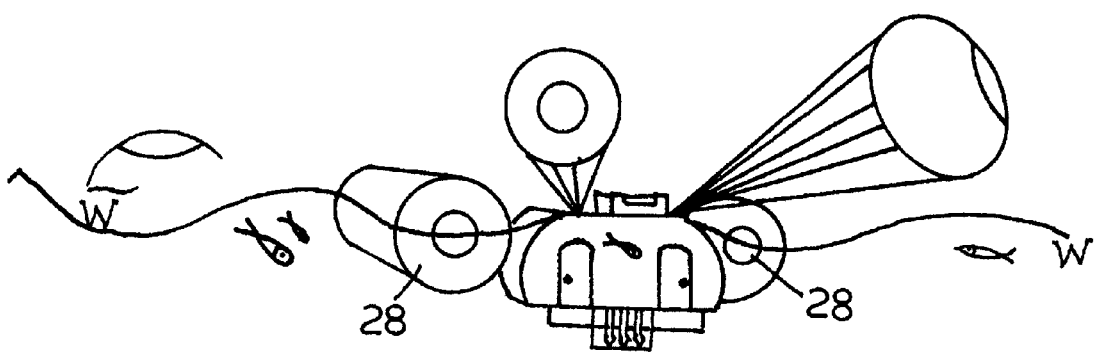
FIG. 3B is a perspective elevation view showing the landing of the passenger cabin on water with the floating rafts and parachutes deployed.
Figure 3:
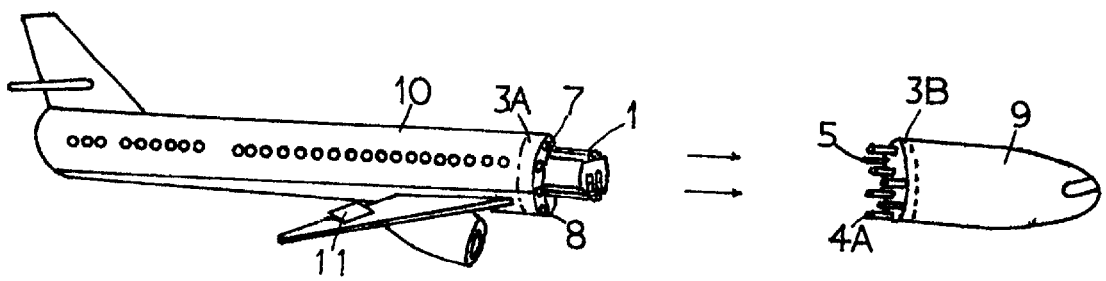
FIG. 3 is a side elevation perspective view showing the separation of the front portion of the airplane at a circular locking ring location

The front portion of the plane is separable from the main body of the plane at the joint as shown in FIG. 3. The separation is activated by the pilot after the abandonment of the plane has been determined. Within seconds of this determination, small rockets 4A within the metal ring 3B are activated to break the plane body as well as to release the spring locks 7 so as to sever the front portion 9 of the plane from the main body 10 housing the passenger cabins 1.

The small rockets 4A are housed in reverse facing tubes 8 in the circular rear separable ring 3A. The rockets 4A contains solid fuel 4. Coupling bars 5 are provided between the spring locks and the mounting. The circular separable rings 3A and 3B are provided with an inner reinforcement ring 6. The coupling bars 5 are inserted into the mounting sleeves 7 formed in the rear separable ring 3A for locking the separable rings 3A and 3B together in place. The landing and take off control flaps 11 on the wings of the plane may be locked at the descending position.

Figure 4:
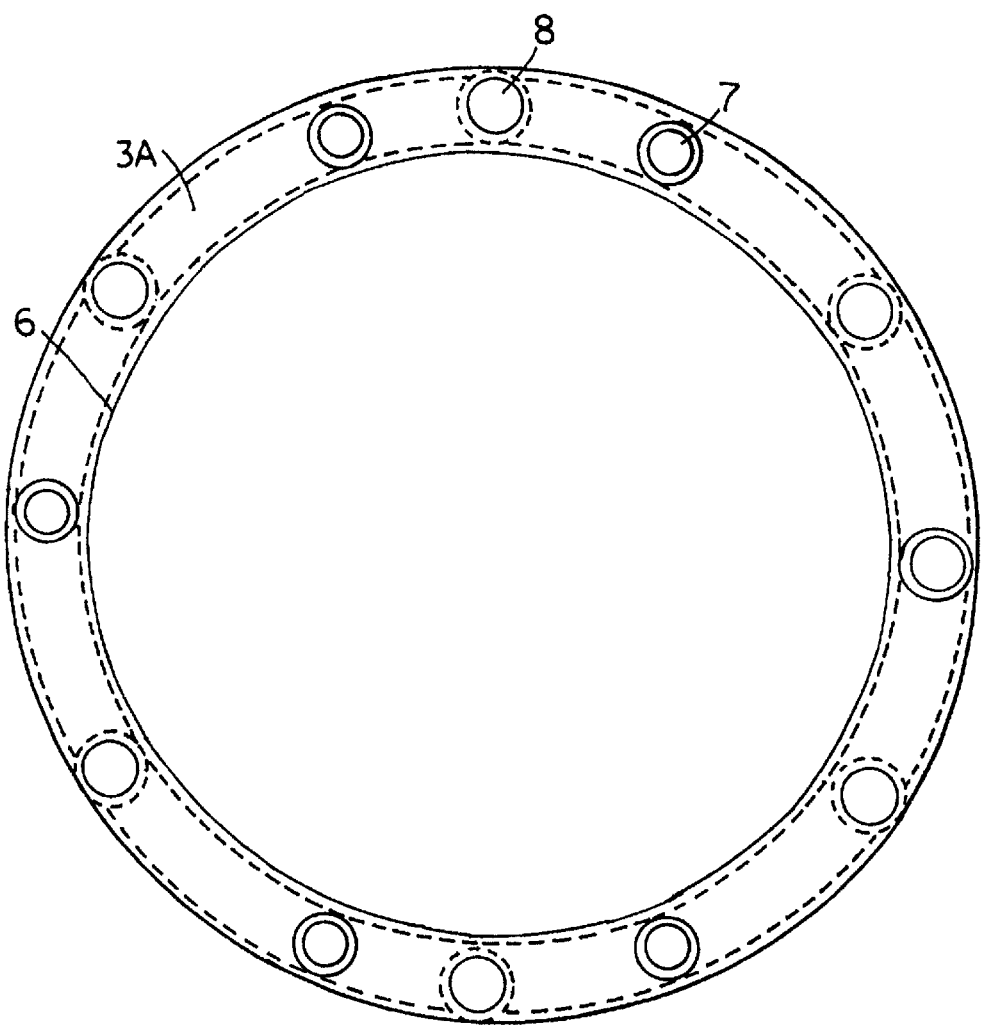
FIG. 4 is a front elevation view of the circular locking ring.
Figure 5:
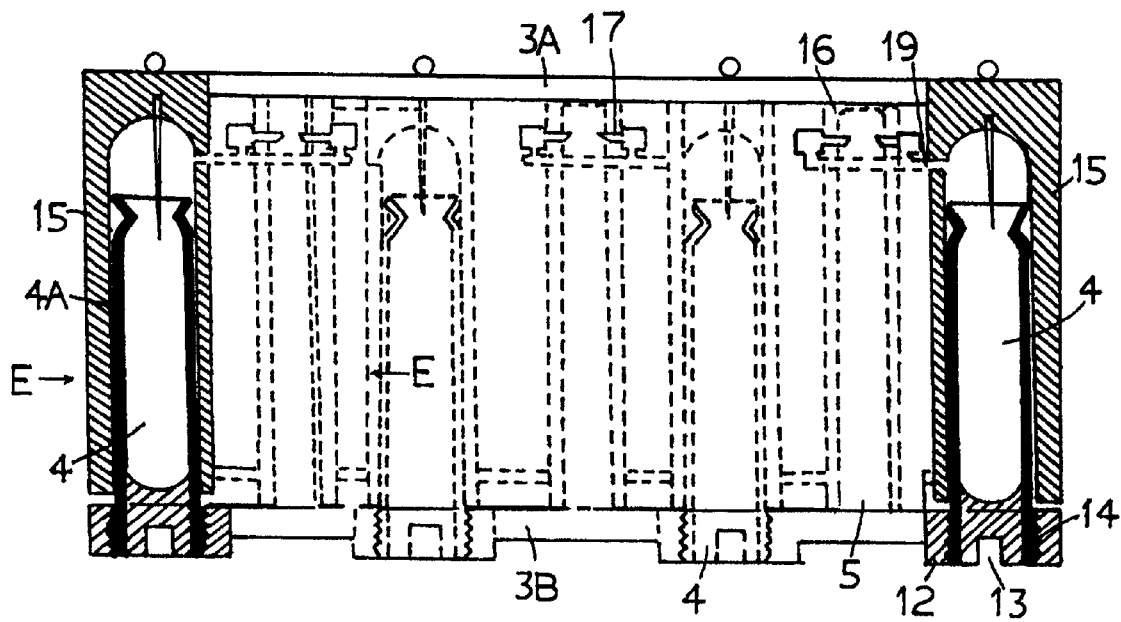
FIG. 5 is an isolated sectional side elevation view of the circular locking ring along section line D—D in FIG. 4 showing the locking components.
Figure 6:
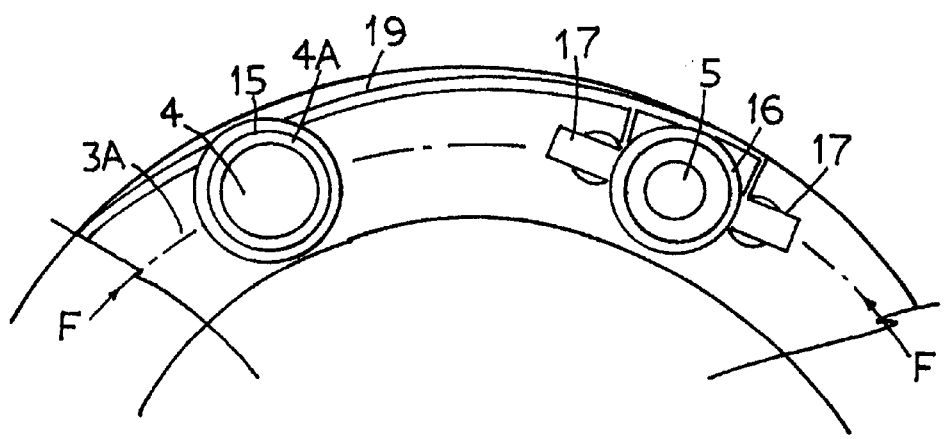
FIG. 6 is an isolated sectional view along section line E—E in FIG. 5 showing the locking mechanism and the rockets ignitable for releasing the locking mechanism.
Figure 7:
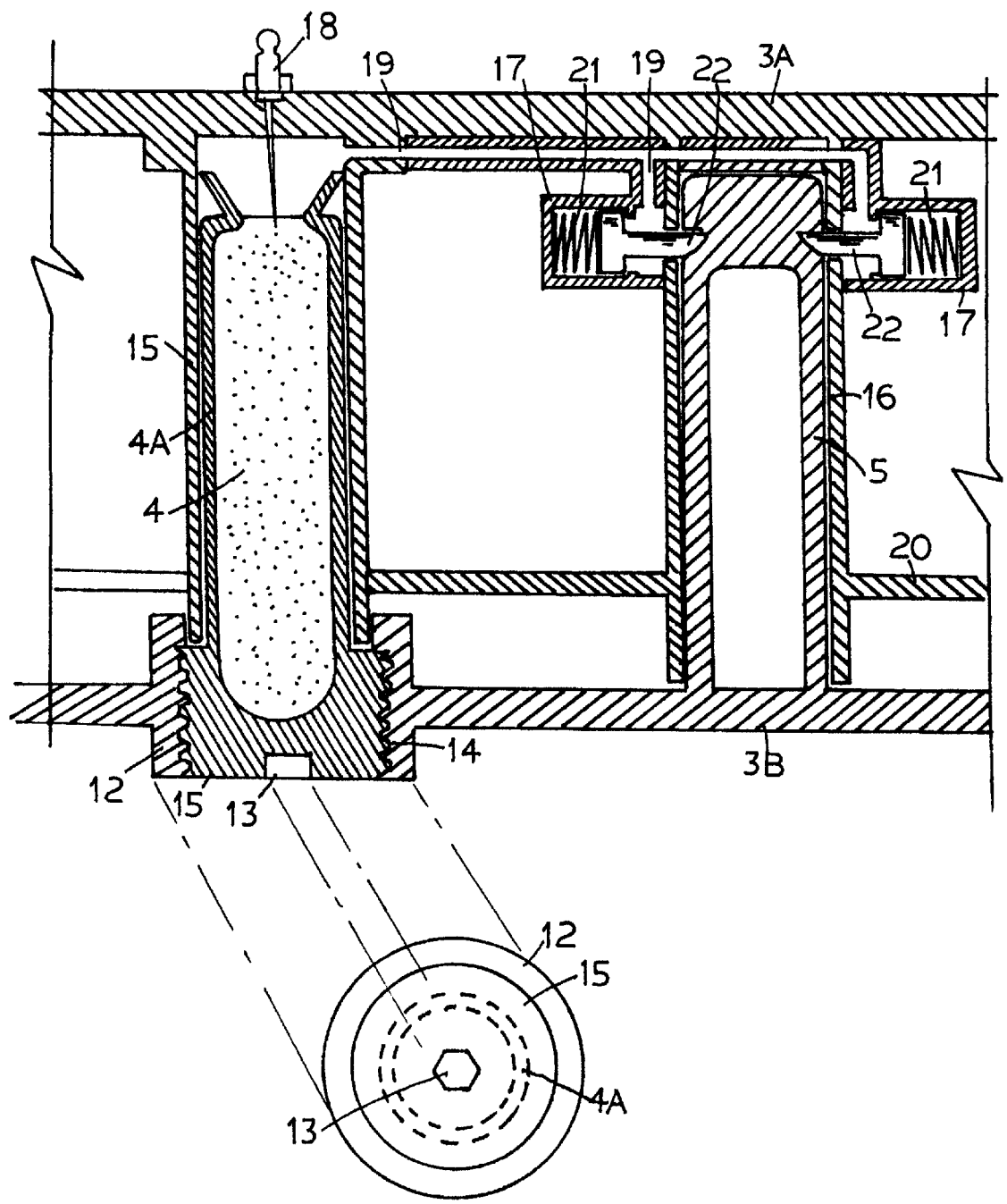
FIG. 7 is an enlarged isolated sectional view along section line F—F in FIG. 6 showing the latching mechanism in the looking ring.

As best shown in FIGS. 4 and 5, the rockets 4A are mounted to the front separable ring 3A by cylindrical tubes 12 having spiral threads 14 formed on their inner side wall so that the rockets 4A may be secured in place or conveniently be removed for replacement and/or inspection. A square key depression 13 is formed at the end of the rocket such that a square head key may be inserted into this depression for turning the rocket for mounting or removing it from the rocket housing 15 in the separable ring 3A. Mounting sleeves 16 are located in the rear separable ring 3A to which the coupling bars 5 in the front separable ring 3B are to be inserted for locking the separable rings 3A and 3B together. A pneumatic locking means 17 is provided in the rear separable ring 3A for latching the coupling bars 5 in place. When the rockets are activated by operating the firing device 18, compressed air generated by the fired rockets will push through the air ducts 19 to the housing tube to unlock these locking means to facilitate the separation of the front portion 9 of the plane from the rear portion 10. The mounting sleeves 15 and 16 are provided with reinforcement 20. As shown in FIG. 7, compression springs 21 are provided for operating the latch 22 for securing the coupling bars 5 in place.

As shown in FIG. 8, the passenger cabin 1 is spaced from the outer shell 23 of the main body 10 of the plane by a spacing 31. The outer shell 23 has a severable joint 24. Rollers 25 are provided on the main body to allow the passenger cabins 1 to separate by sliding away from the main body 10 in an accident. The rollers 25 are rotatably mounted on mounting bars 25A located on the main body 10. A rocket tube 29 is mounted in the middle of the upper end wall of the passenger cabin 1, which is operable to push the passenger cabin 1 away from the main body 10 during separation. The passenger cabin 1 has sealing doors 35A which are normally opened and they will be automatically shut in an emergency.

Figure 10:
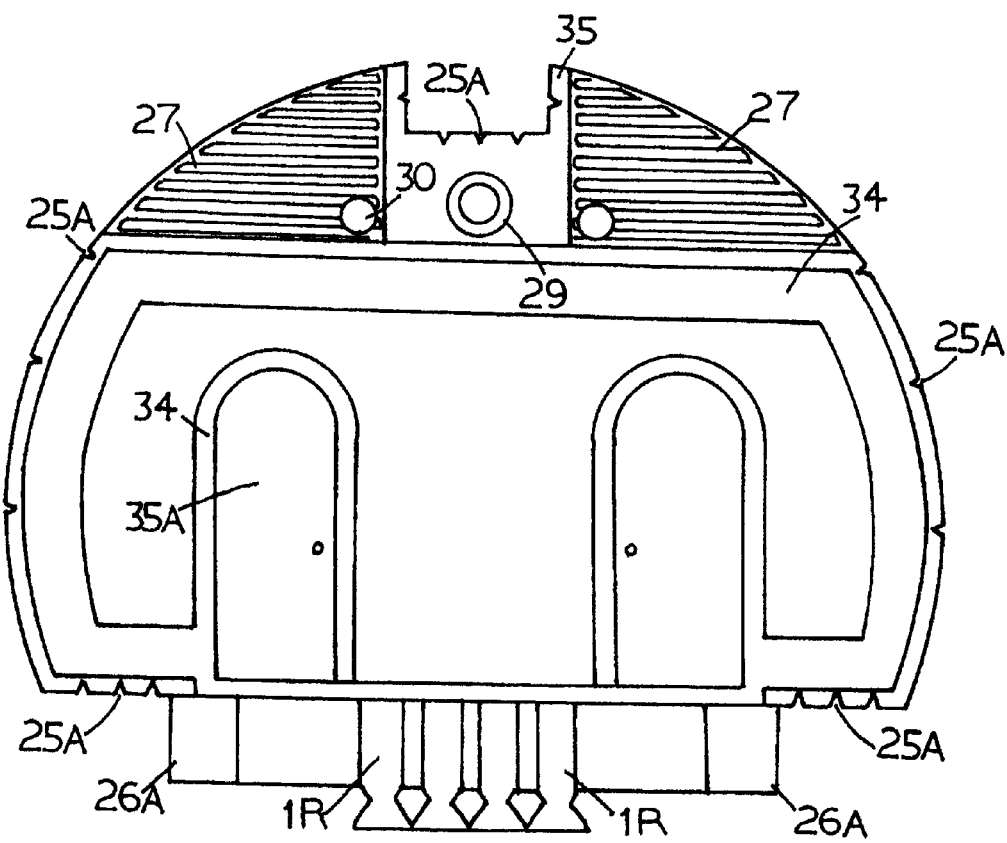
FIG. 10 is an isolated front view of the individual passenger cabin.
Figure 11:
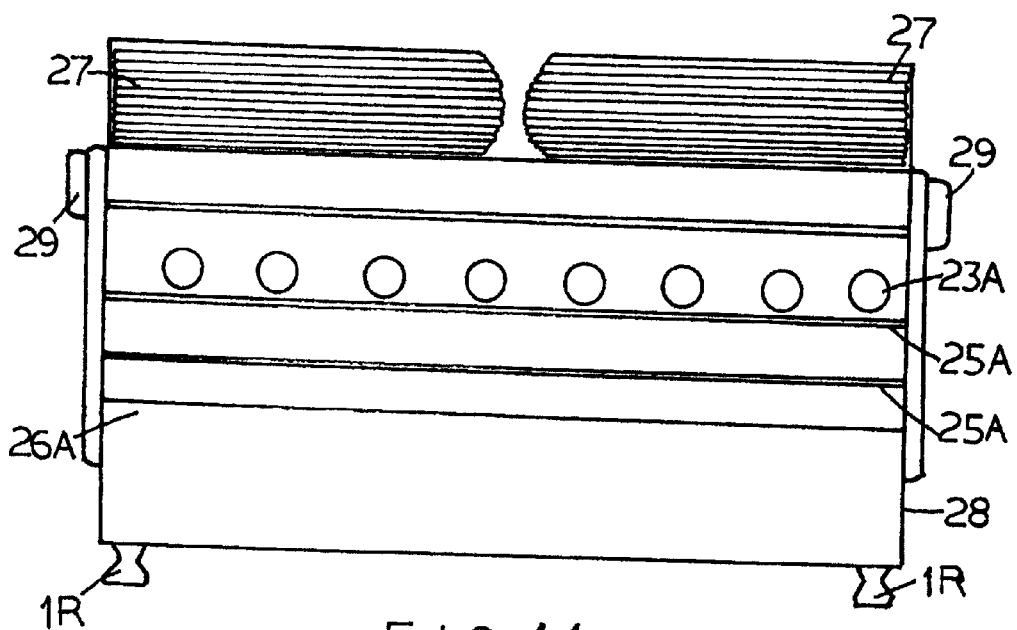
FIG. 11 is a side elevation view of the individual passenger cabin.

As shown in FIG. 10, the passenger cabin 1 is capable of tightly shutting its seal doors, blocking the air vents, regulating its own cabin pressure. It also carries its own oxygen supply and heating means. Every passenger cabin is provided with four automatic deploying parachutes. A compressed air container is provided below the cabin, which supplies the air required for inflating the floating bags or rafts 28 when the passenger cabin lands on water as shown in FIG. 3B. In order to prevent the plane body from rolling in the air, channels 35 and 23A are located at the joint of the projected support to cooperate with the lower support 26A to sandwich the plane body and the passenger cabin securely in place.

Figure 12:
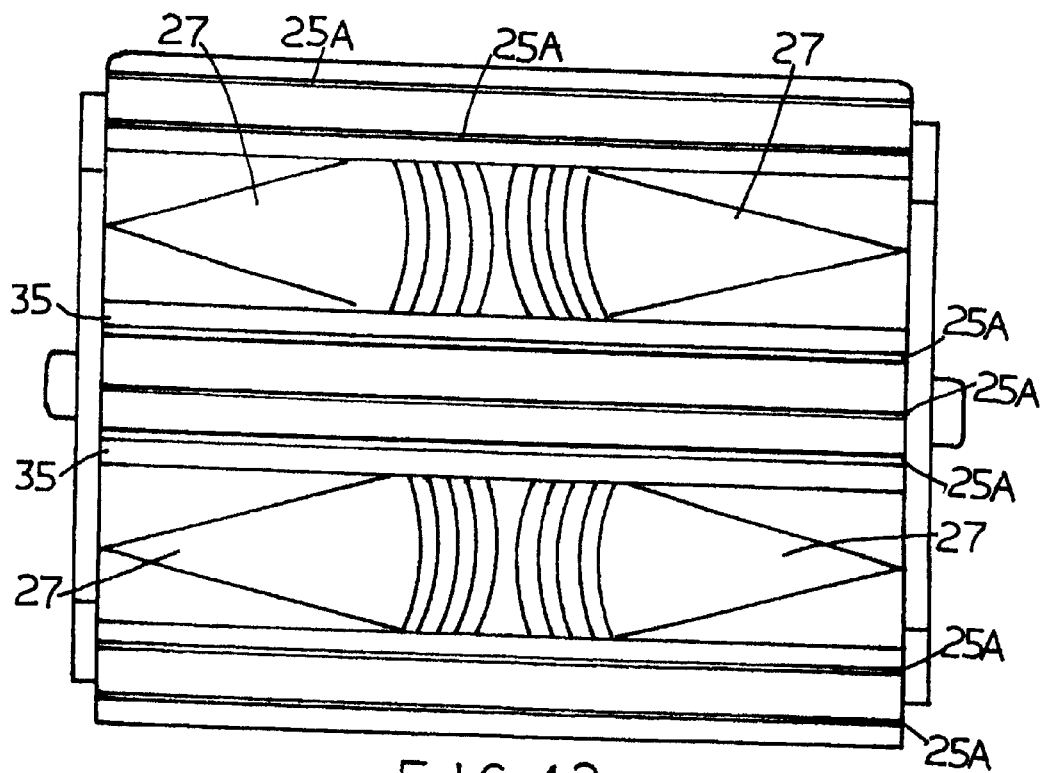
FIG. 12 is a top elevation view of the individual passenger cabin.
Figure 13:
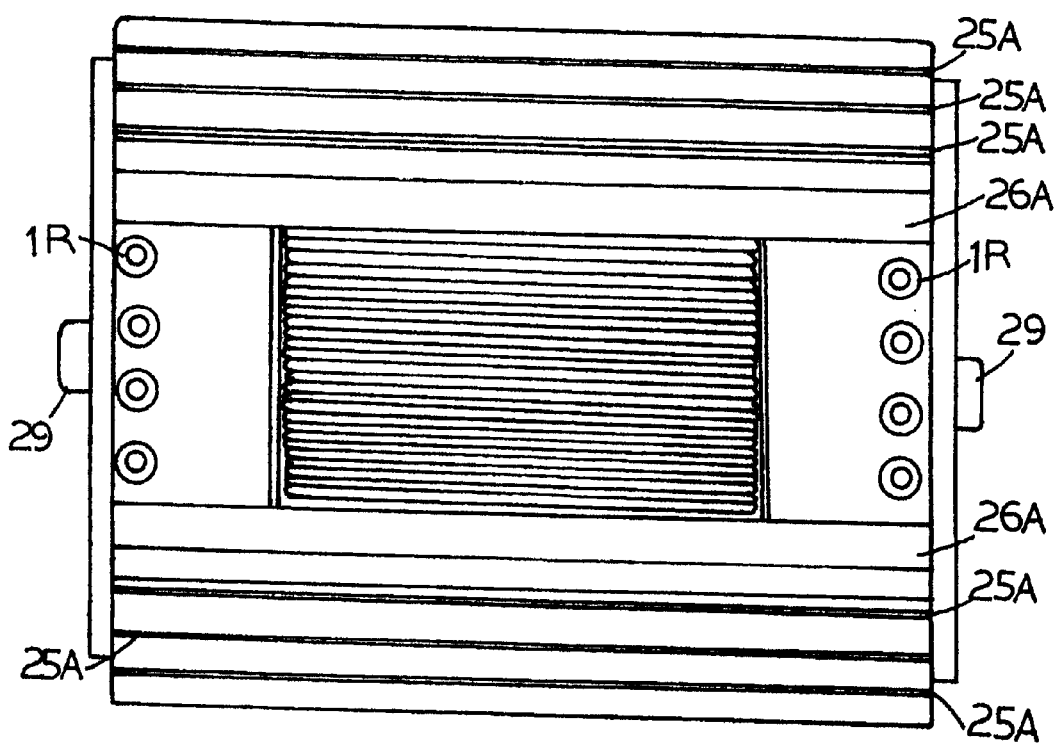
FIG. 13 is a bottom elevation view of the individual passenger cabin.
Figure 14:
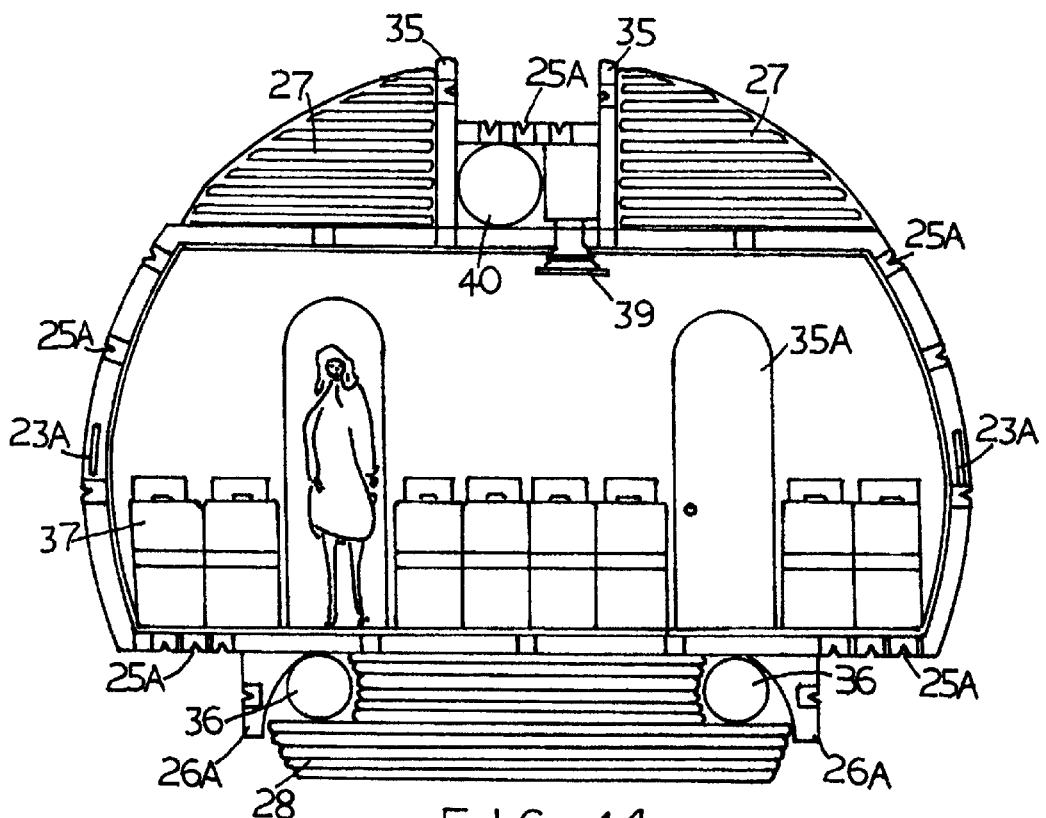
FIG. 14 is a front sectional elevation view along section line G—G in FIG. 12 showing the interior of the passenger cabin.
Figure 22:
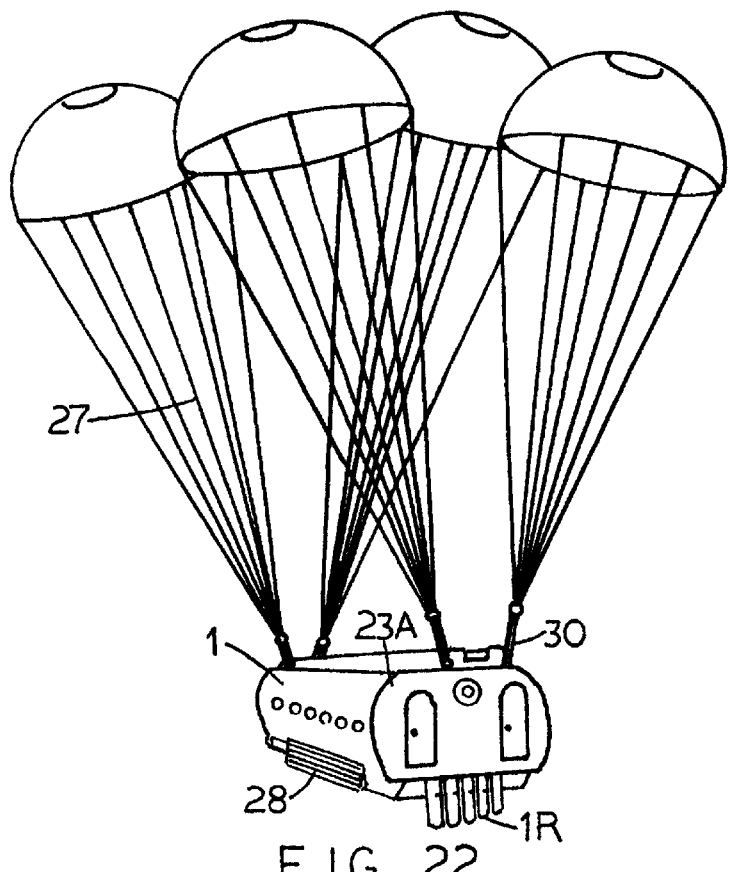
FIG. 22 is a perspective elevation view of the passenger cabin suspended by the parachutes.

As shown in FIGS. 12, 13 and 22, the passenger cabin 1 has structural supports 26A, and parachutes 27 are mounted on its top, which may be deployed to provide its safe descend to the ground. Reverse propulsion jets 1R are provided at the bottom of the passenger cabin. These reverse propulsion jets 1R are operative to provide a reverse thrust for slowing down the descend of the passenger cabin to a safe speed. Additional landing propulsion jets 2F are mounted on safety pillars of the passenger cabin for safely landing the latter on the ground. All propulsion jets are provided with a safety nozzle.

The inflatable bags or rafts 28 are mounted at the bottom of the passenger cabin. The impact of the cabin on water will trigger the control to release the compressed air required for inflating these bags or rafts 28 so as to provide the floatation for the cabin.

A rocket tube 20 is located between all neighboring passenger cabins. An electric sensing eye is provided at the front end of the tube 29 such that it will be actuated to release an exploding air as soon as its front end is leaving outside of the plane body. The exploding air will push the cabins away from each other to ascertain a safe distance between them after they have separated from the plane body.

A shock absorber 30 is mounted between each parachute and the passenger cabin and the plane body. The absorber 30 operates to reduce the sudden pulling force imposed on the cabin during the deployment of the parachutes. A protruding footing 32 is provided in the main body for supporting the rollers 25 to facilitate the sliding movement of the passenger cabins, and luggage and various other compartments 33 are located in the lower portion of the main body. A hard plastic layer 34 is provided on the outside surface of the passenger cabin for reducing vibration or shock. Also, support channel bars 35 are located at the top of the passenger cabin to maintain the latter in a stable position when the plane body is rolling during the accident in order that the passenger cabin may slide away form the plane safely.

Figure 15A:
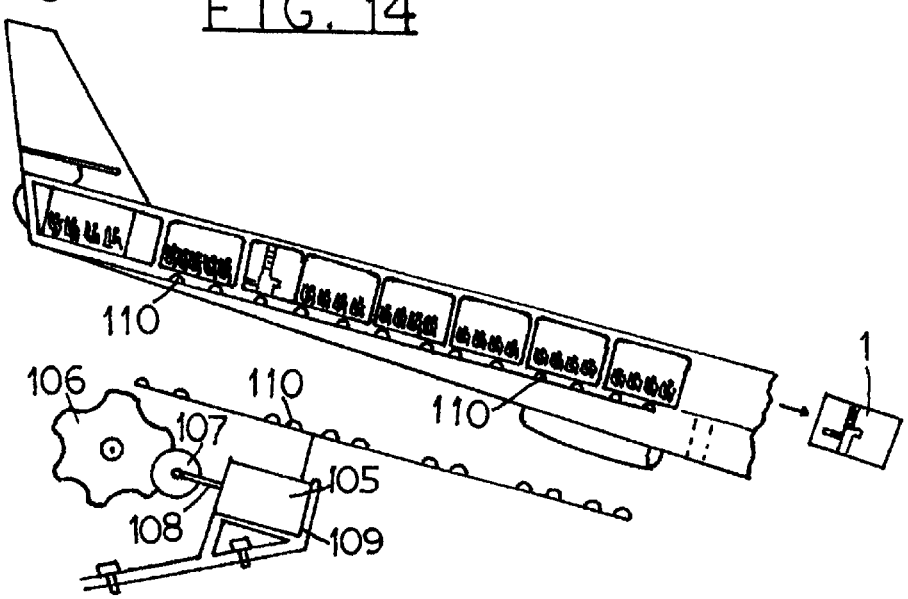
FIG. 15A is an enlarged isolated view showing the braking mechanism of the rollers.

As shown in FIG. 15A, braking mechanism 105 is operable for controlling the sliding movement of the passenger cabins from the plane body. The braking mechanism is not activated initially when the cabin is starting to leave the plane body so as to increase the speed of separation. This will ensure a safe distance is provided between the separate cabins after leaving the plane body and there is no interference with the deployment of the parachutes of all cabins. An electric storage tank located at the tail end of the plane provides the initial power to push the passenger cabins out of the plane. The braking mechanism 105 mounted on a fixed support 109 is operated by a cam wheel 26 mounted to a slow speed motor to engage with the brake shoes 110 mounted on the main body of the plane. The cam wheel 26 engages with a free rotary wheel 107 mounted to a reciprocating coupling bar 108.

Figure 15:
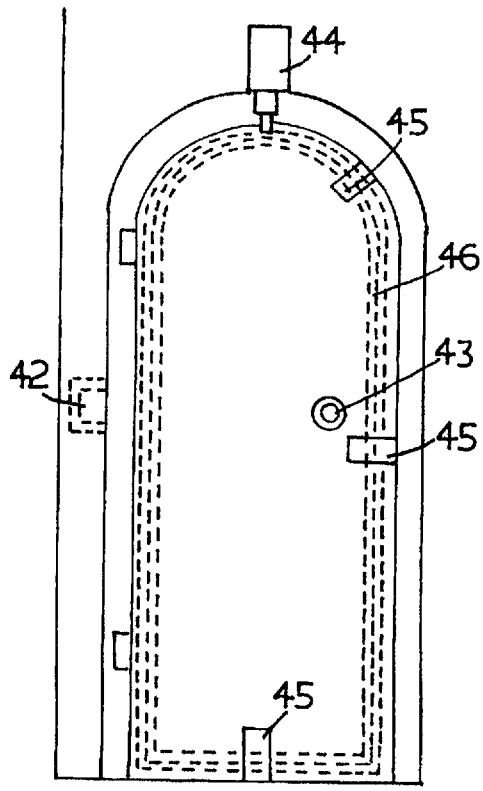
FIG. 15 is an enlarged isolated front elevation view of the sealing door of the individual passenger cabin.
Figure 16:
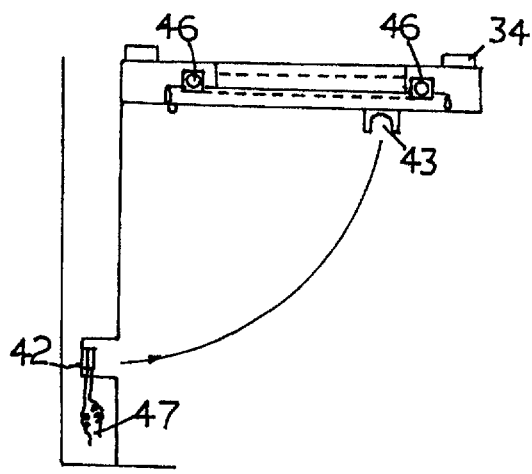
FIG. 16 is an isolated top cut view showing the door and the door frame.
Figure 17:
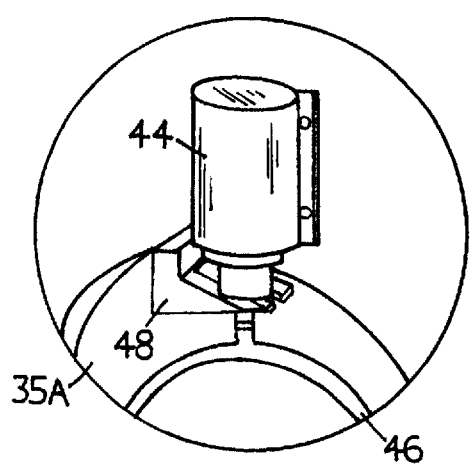
FIG. 17 is an isolated enlarged perspective elevation view of the compressed air tank mounted at the top of the door.

As shown in FIGS. 15, 16 and 17, the sealing doors provided on each individual passenger cabin must be shut immediately upon activation. The shutting operation is effected by a compressed air arrangement. A compressed air tank 44 is mounted at the top of the door to provide the means for shutting the sealing doors of each passenger cabin. Normally, the sealing doors are opened. In an accident, a air bullet 42 of the size of a coffee cup located behind the round door handle 43 will be activated by an electrical control actuated through wiring 47 to shut the sealing doors. Spring latches 45 located at the top, middle and bottom of the door will also be activated to maintain the doors tightly shut. Also, as shown in FIG. 17, a lifting mechanism 48 will engage with the valve of the compressed air tank 44 to release the compressed air into a hollow rubber tubing 46 on the door frame to provide a tight seal around the doors.

Figure 18:
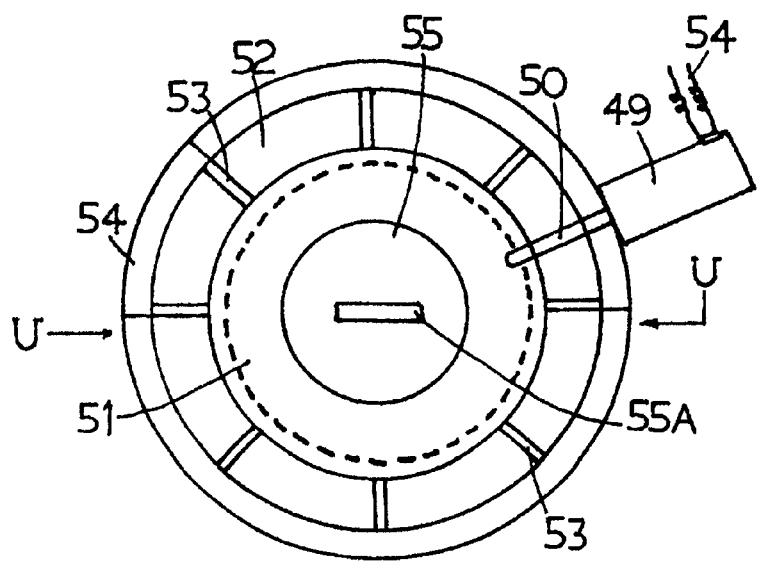
FIG. 18 is an isolated enlarged partial sectional view of the ventilation shut off valve of the passenger cabin.
Figure 19:
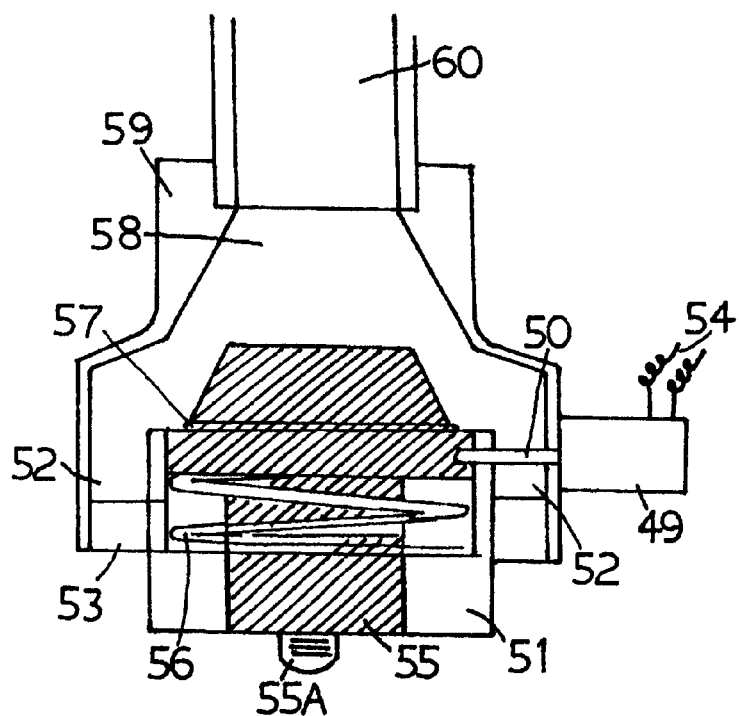
FIG. 19 is a sectional view along the section line U—U in FIG. 18.

A ventilation shut off valve as shown in FIGS. 18 and 19 is provided in each individual passenger cabin. This valve is operative to maintain the air and air pressure within the passenger cabin. It is normally held opened by an electromagnetic lock 49 having a latch 50. It has a circular base 51 supporting an up and down moving plunger 55 biased by a spring 56. Air flows through an air duct 52 of the valve, formed by the space between the connectors 53 located between the circular base 51 and the outer casing 59. The electromagnetic lock 49 is actuated by electrical power supplied through electrical conductors 54. Normally, the plunger 55 is located in a retracted position by the electromagnetic latch 50 inserted into it; and in this position, its reactive spring 56 is compressed. In an emergency during the accident, the electromagnetic latch 50 will be retracted so that the expanding reactive spring 56 will force the plunger 55 to shut the valve by pressing against the air inlet 58 which is connected also to the central air conditioning duct 60 so as to maintain the original air pressure within the passenger cabin.

Figure 20:
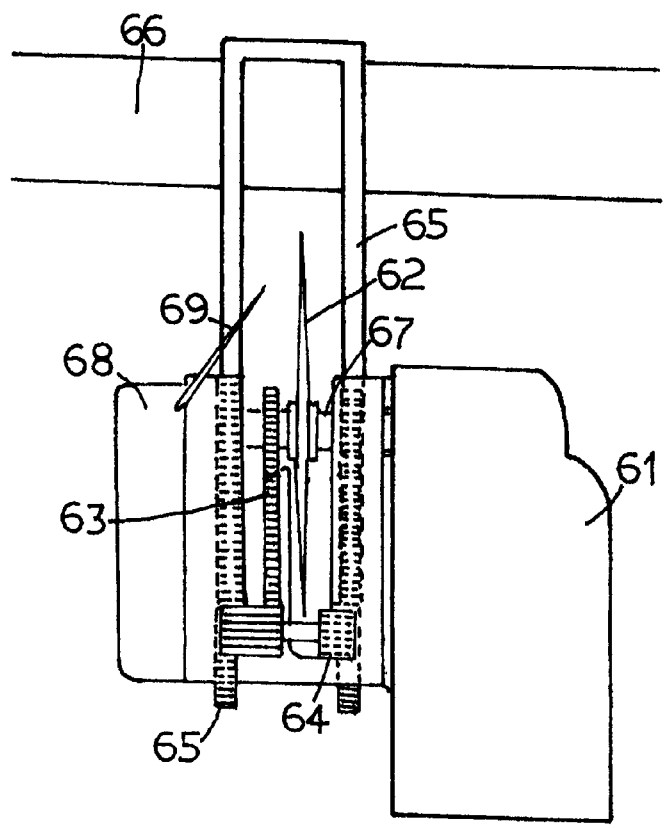
FIG. 20 is an isolated enlarged elevation view of the automatic cutting mechanism.
Figure 21:
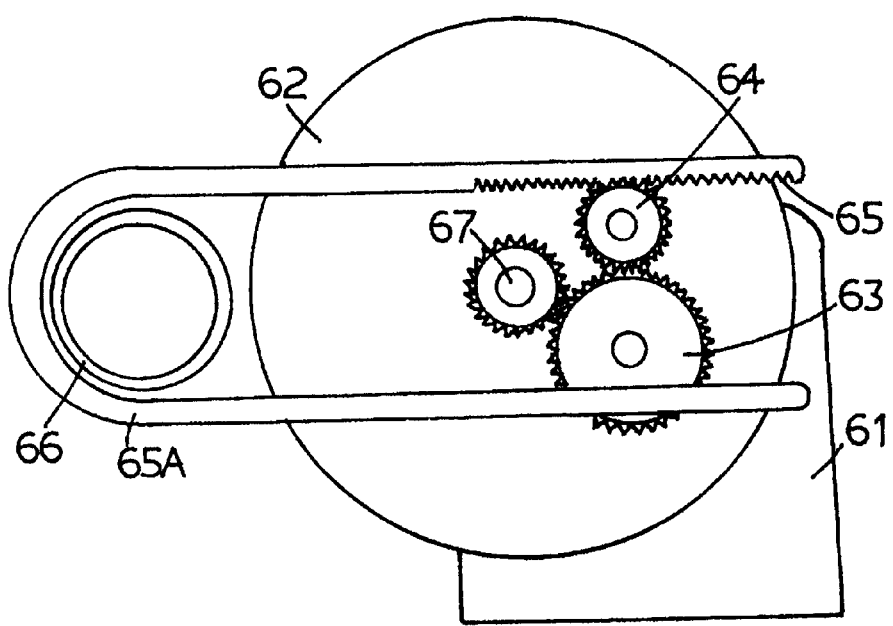
FIG. 21 is a side perspective view of the automatic cutting mechanism.

When the passenger cabin is separated from the main body of the plane, the electrical wiring and the venting and air conditioning duct 66 will initially remain connected between them. An automatic cutting mechanism is activated to sever these electrical wiring and the venting and air conditioning duct in a very short time. As shown in FIGS. 20 and 21, the automatic cutting mechanism is operated by an electric motor 61 which turns the speed changing gear wheel 63 to rotate the speed stepping wheel 64 to cause the coupling rod 65 to move forwards in a high speed to turn a circular blade 62 to provide the cutting operation.

As shown in FIG. 22 the passenger cabin is suspended by the deployed parachutes after it has separated from the plane. Its sealing doors are tightly shut. Its air duct outlet port is closed to prevent air leakage and the interior of the cabin is provided with oxygen and heating supplies.

Figure 23:
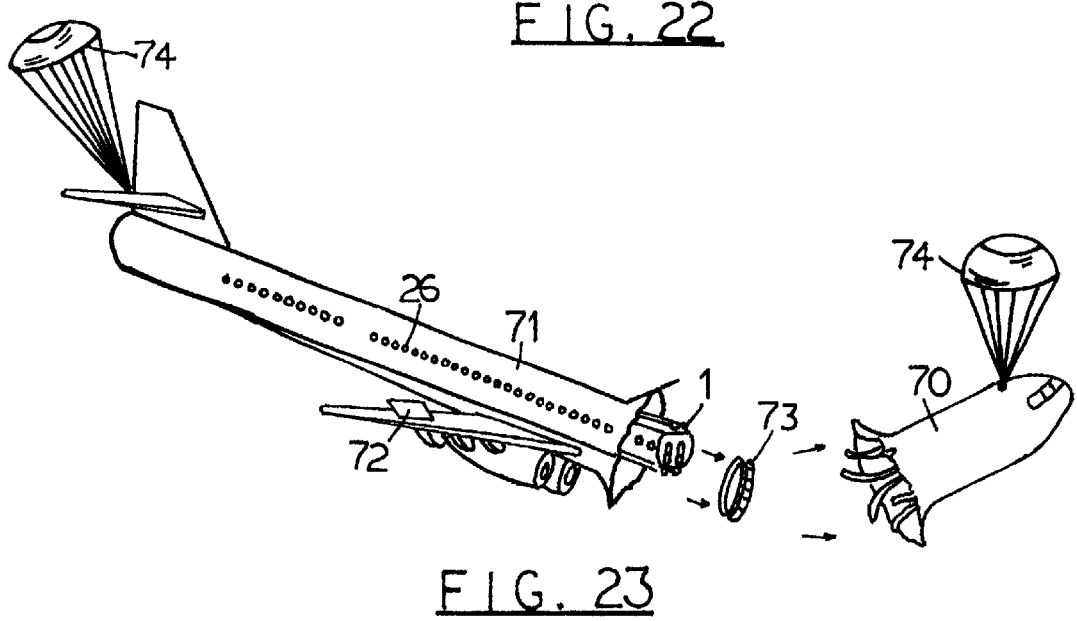
FIG. 23 is a perspective side elevation view illustrating two alternative methods of severing the plane boding in an air accident.
Figure 24:
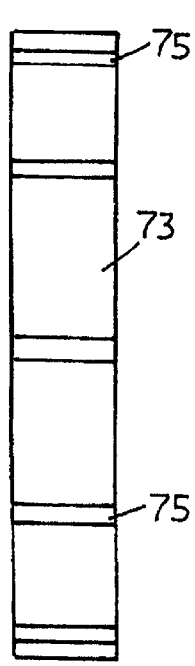
FIG. 24 is a side perspective elevation view of the restrictive explosion ring.
Figure 25:
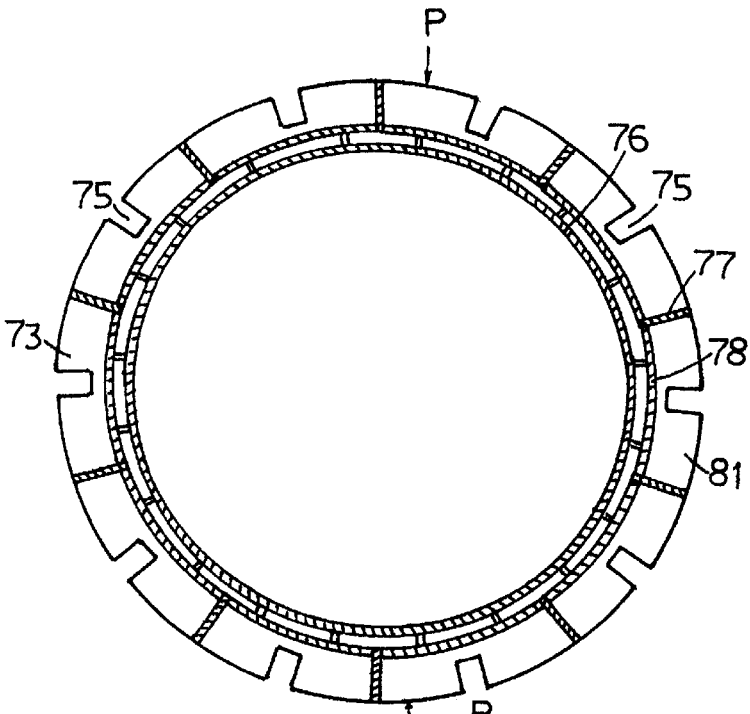
FIG. 25 is a front perspective elevation view of the restrictive explosion ring.
Figure 26:
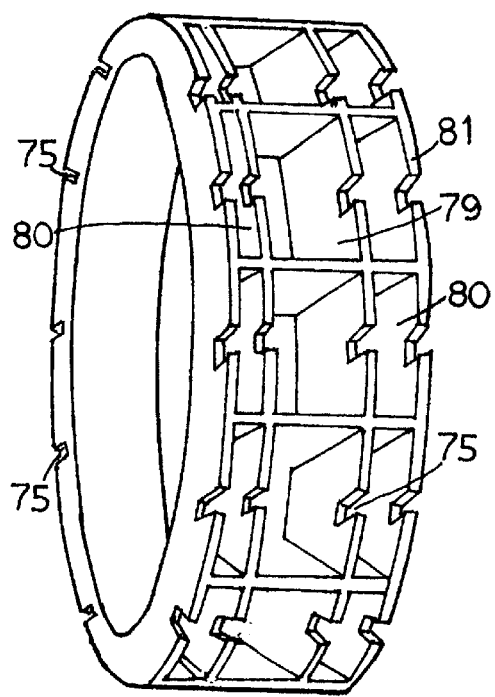
FIG. 26 is a perspective elevation view of the restrictive explosion ring showing its interior construction.
Figure 27:
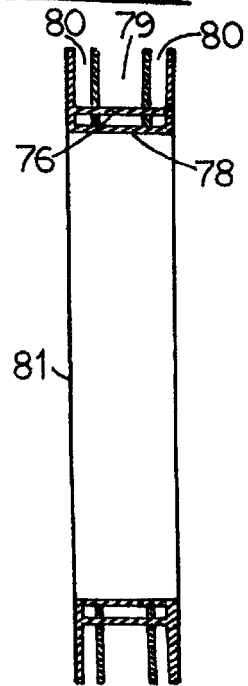
FIG. 27 is a sectional side view along section line P—P in FIG. 25.
Figure 28:
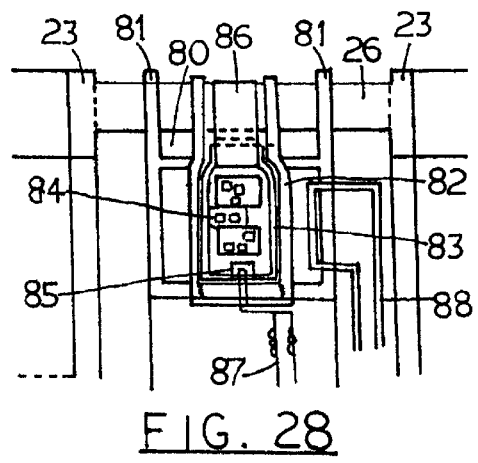
FIG. 28 is an isolated side elevation view showing the placement of the explosion device in the restrictive explosion ring.
Figure 29:
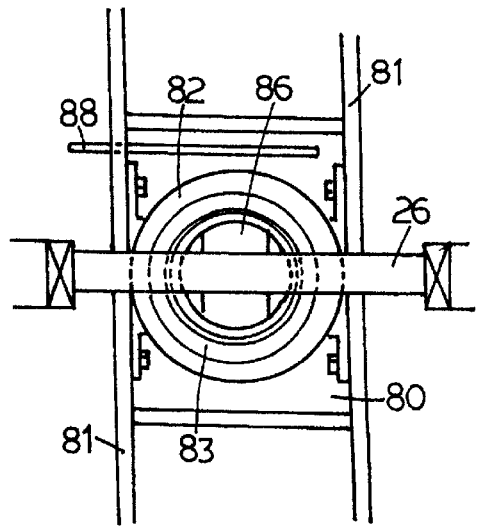
FIG. 29 is a top elevation view of that shown in FIG. 28.
Figure 30:
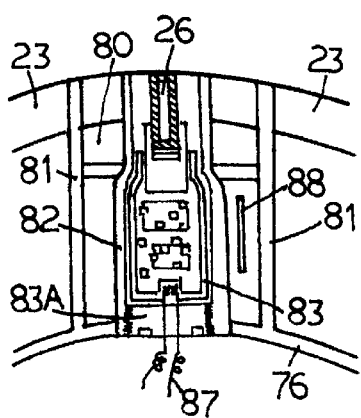
FIG. 30 is a sectional front view of that shown in FIG. 28 with the plane body extending transverse to the restrictive explosion ring.
Figure 31:
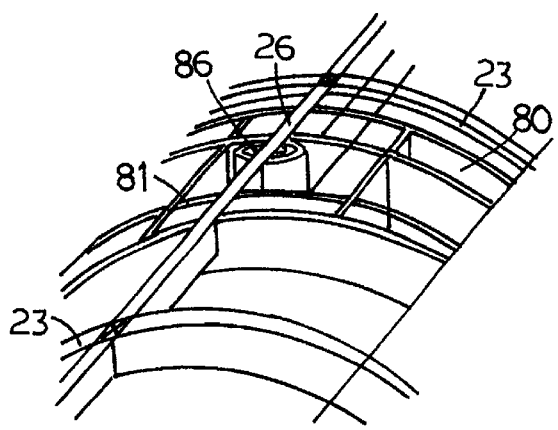
FIG. 31 is an isolated perspective view of the fuseless explosion device in the restrictive explosion ring.
Figure 32:
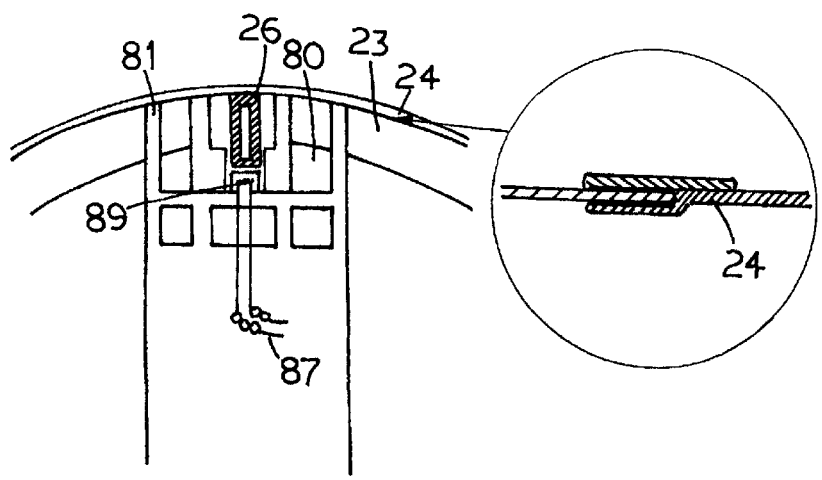
FIG. 32 is an isolated elevation view of the installation of the explosive in the restrictive explosion ring.

Another alternative method for severing the plane body in an air accident is shown in FIG. 23. The method installs a dynamite box about ¼ the size of a conventional grenade at a plurality of selected locations of the plane body frame. The dynamite boxes are placed within a restrictive explosion ring 73 (the detail of which is shown in FIGS. 24 to 27) and they may be activated by electrically operated triggers. Such logical designs may be quickly and safely installed in a plane, for severing its body without any potential safety hazard. As shown in FIGS. 24 to 27 the restrictive explosion ring 73 has openings and a plurality of peripheral grooves 75 formed around its outer edge to facilitate its installation onto the plane frame. It has a reinforcing inner wall 76 and radially located reinforcing rods 77 extending outwards from a circular base wall 78. The explosive is located in compartments 79. A secondary safety space 80 is provided between neighboring explosive compartments and the side protective plate 81 of the ring. The placement of the explosion device in the restrictive explosion ring is shown in FIGS. 28, 29 and 30. The explosive device has a casing 83 which is made of a fire and heat resistant material, and it is mounted in the restrictive explosion ring. The casing 83 is retained in place by a threaded base 83A which may be readily removed for examining the explosive device. A plurality of explosive pouches or boxes 84 are located in the casing 83. The explosive is contained in these pouches 84. The explosive pouches 84 may be detonated by an electrical trigger 85 mounted on the casing 83, which receives its activation electrical power through conducting wires 87. A cutting knife 86 is mounted on the restrictive explosion ring to enhance the breaking of the explosive device when it is detonated. A surrounding water cooling jacket 88 is provided for maintaining the explosion ring in a low temperature.

Figure 33:
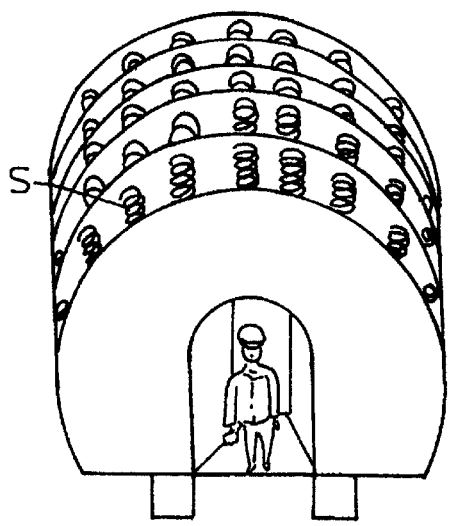
FIG. 33 is a perspective isolated elevation view of the shock absorber construction in the plane body which has a plurality of springs.
Figure 34:
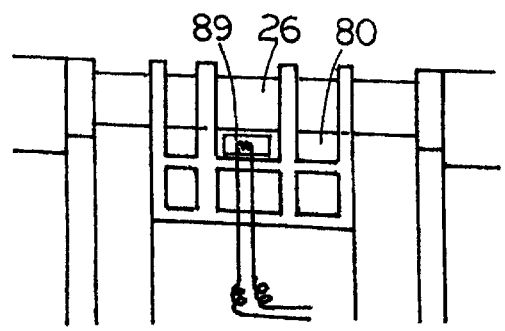
FIG. 34 is an isolated sectional side view of a portion of that shown in FIG. 32.

A shock absorbing device, as shown in FIG. 33, is operative to reduce the impact when the plane crashes head on against a mountain, or in a forced landing, or in an accident at a low altitude during take off. The shock absorbing device contains a plurality of springs sandwiched between a collapsible multi-tiers structure. Alternatively, within a short period before the crash the pilot may also have the option of activating the explosive to break the plane body such that the passenger cabins may be separated from the plane as described above.

Figure 35A:
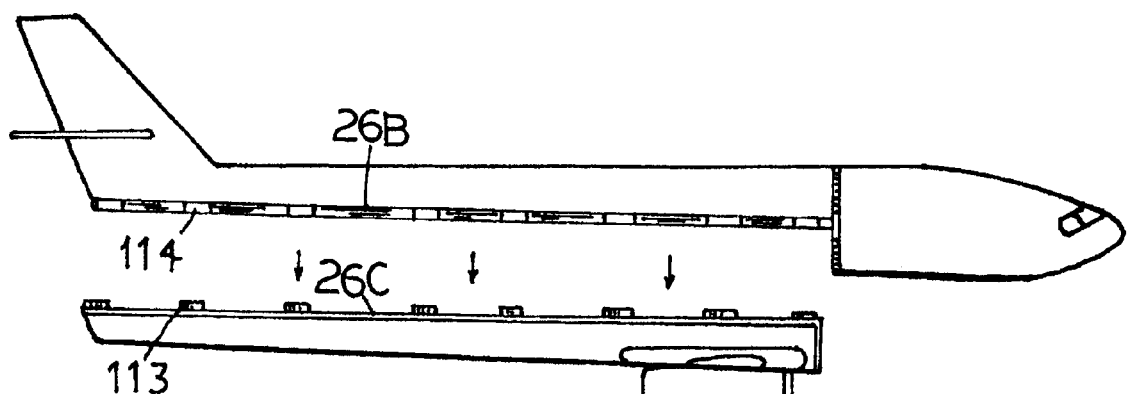
FIG. 35A is a sectional side elevation view showing an alternative embodiment of severing the plane body into separate upper and lower portions.
Figure 35B:
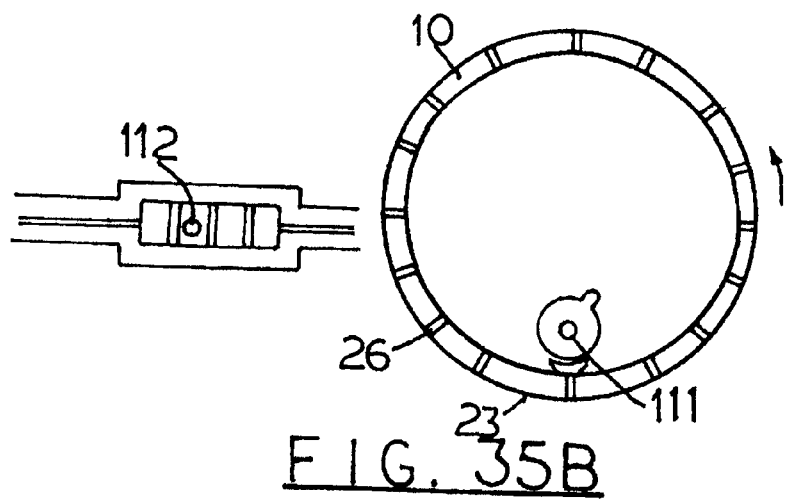
FIG. 35B is an isolated perspective view of the location of laser cutting means for severing the plane body in the embodiment shown in FIG. 35A.
Figure 35:
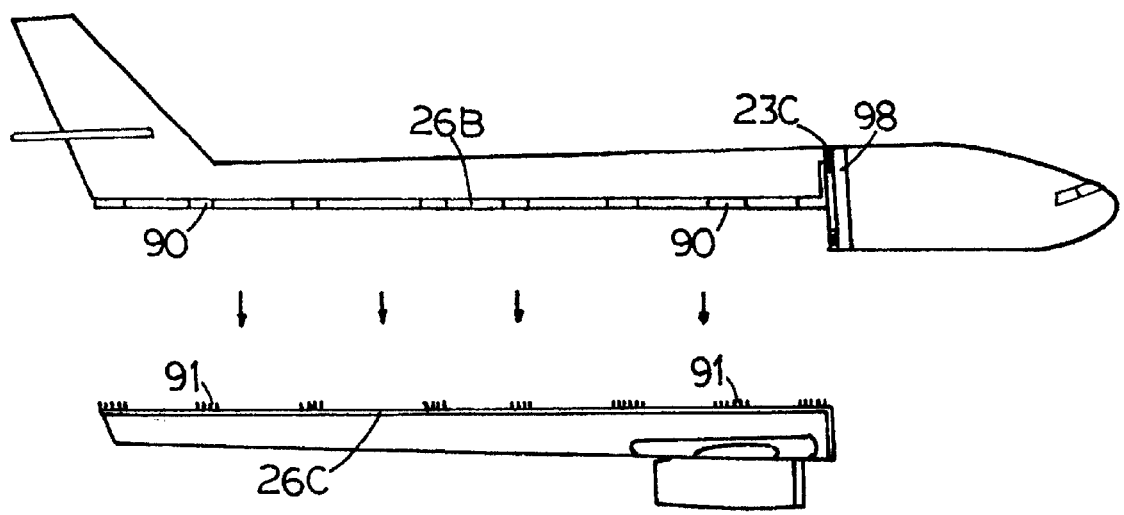
FIG. 35 is a side elevation view showing the provision of mounting mechanism between the top portion and lower portion of the plane body.
Figure 36:
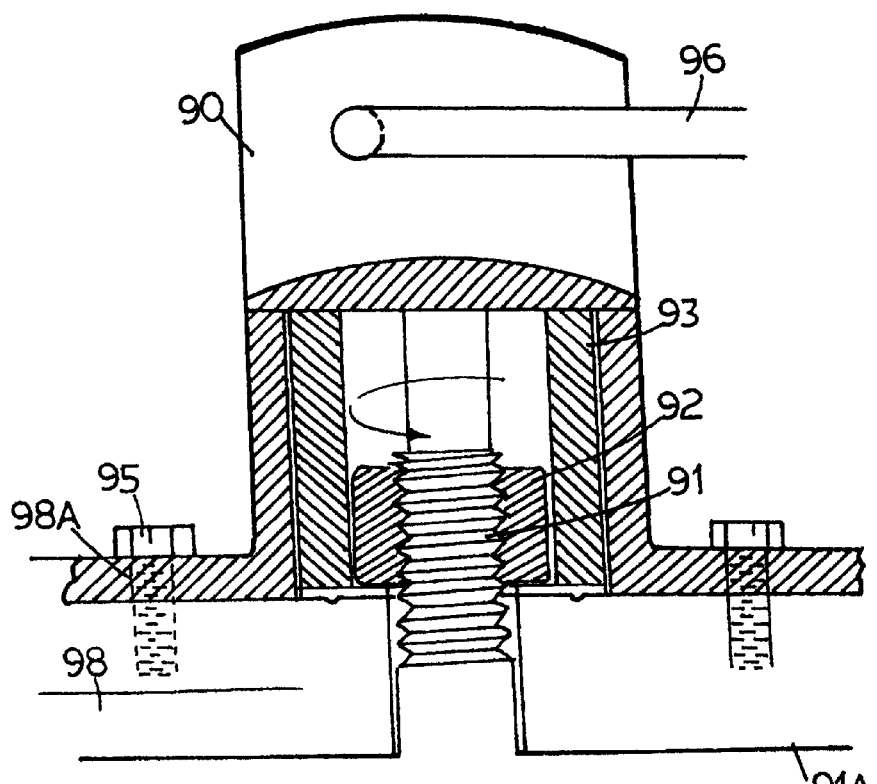
FIG. 36 is an isolated enlarged sectional side view of the pneumatic wrench operable for releasing the mounting mechanism shown in FIG. 35.
Figure 37:
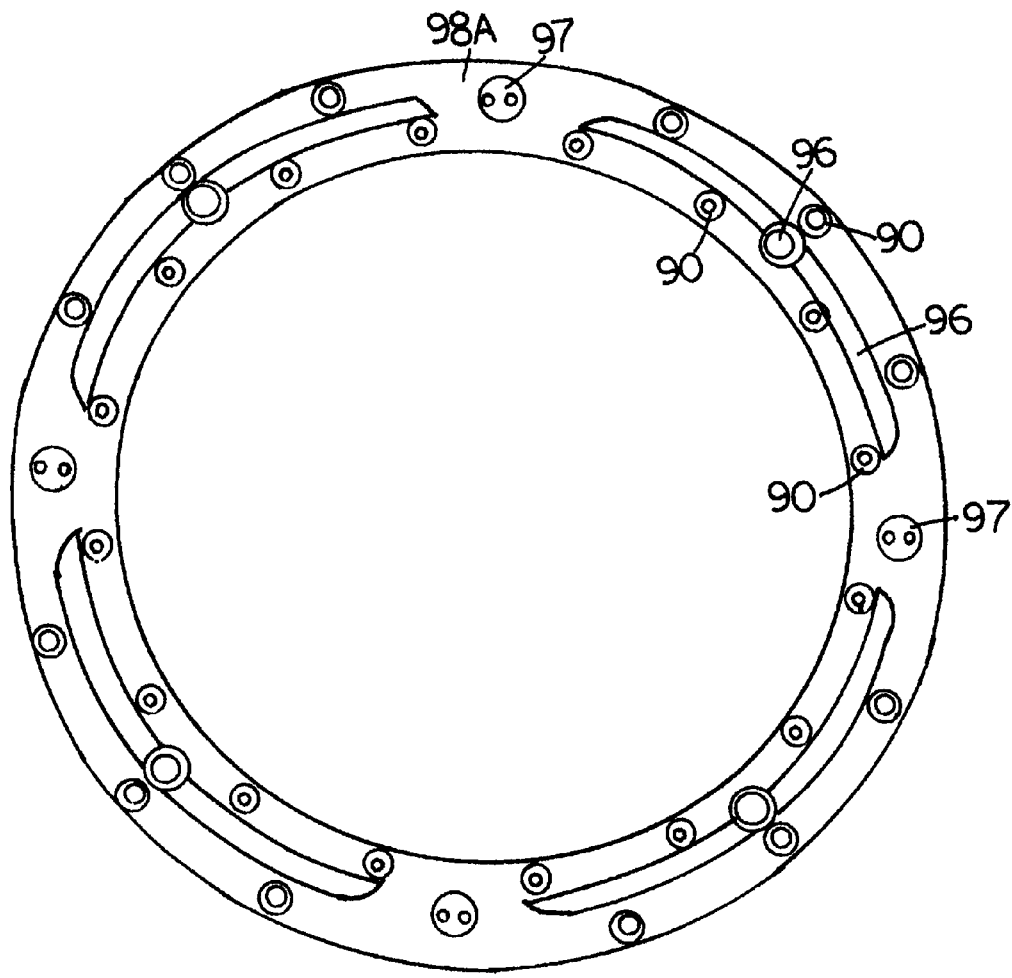
FIG. 37 is a front elevation view of the mounting ring between the separable front part and the main body of the plane.
Figure 38:
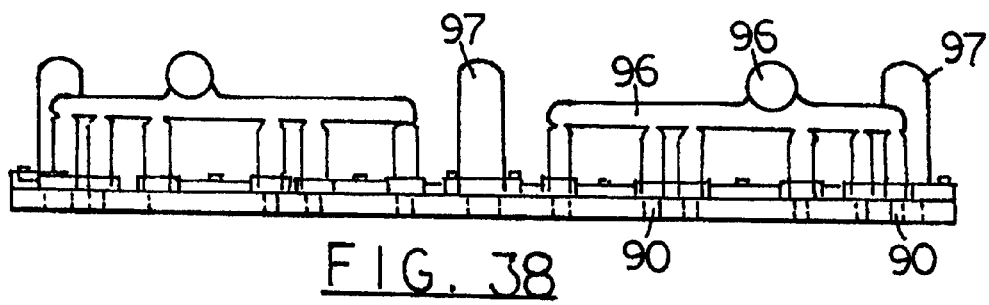
FIG. 38 is a side elevation view of that shown in FIG. 37.
Figure 39:
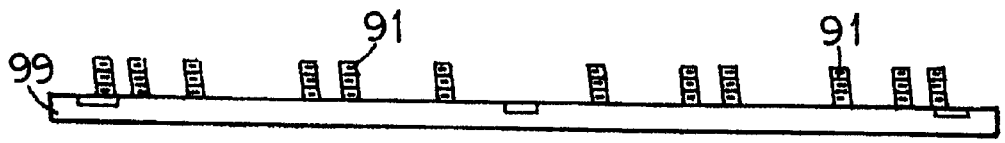
FIG. 39 is a side elevation view of the mounting ring on the severable front portion of the plane and located at severable position B—B of the plane as shown in FIG. 1.
Figure 40:
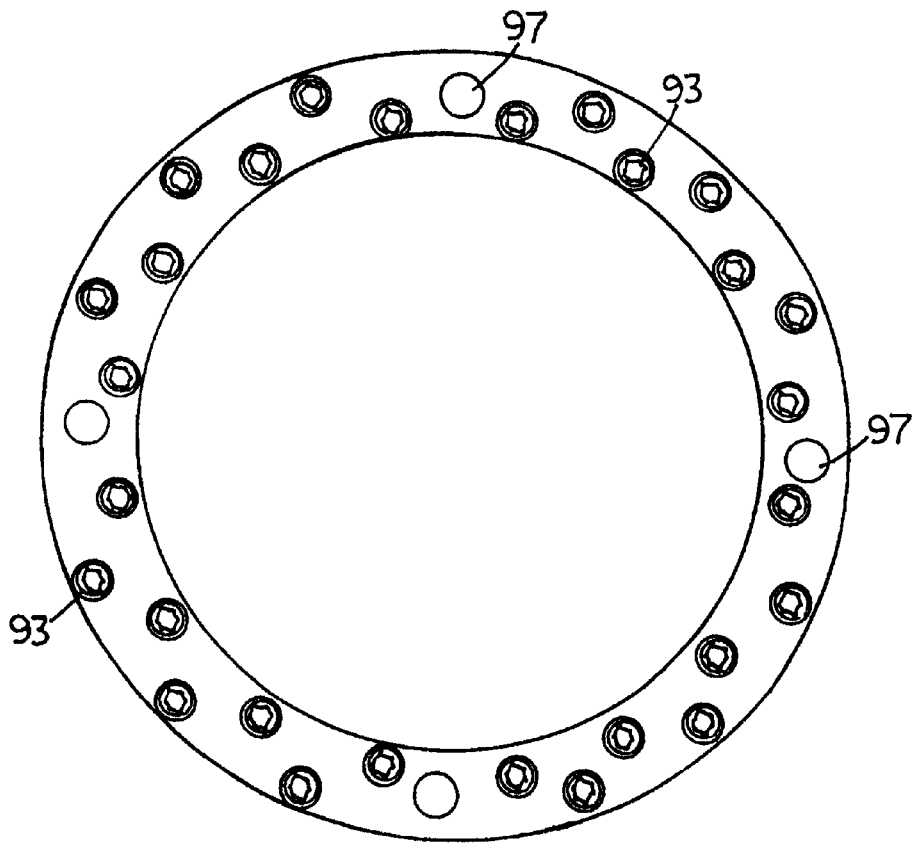
FIG. 40 is a rear perspective view of the mounting ring located in the main body portion of the plane at the severable position.
Figure 41:
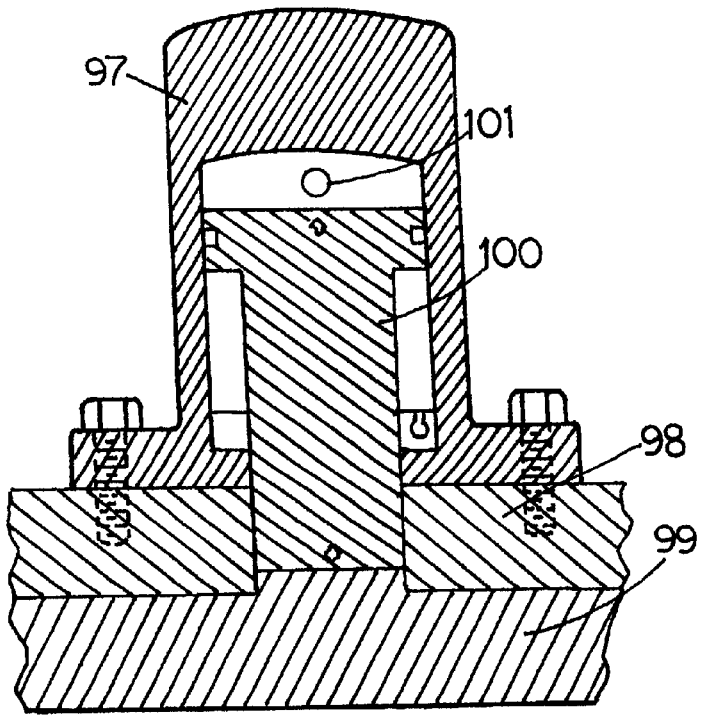
FIG. 41 is an isolated enlarged sectional side elevation view of the compressed air operated separation device operable for severing the plane body at the severable position.

As shown in FIG. 35, in an air accident, a plane body may be severed by other than controlled explosion, which may be carried out in a static manner. One method is by employing pneumatic wrenches which are positioned in selected locations so that they may be used for loosening mounting nuts or screws securing severable portions of the plane body together. As shown in FIG. 36, the pneumatic wrenches may be used to disassemble the plane body within one minute. The pneumatic wrenches 90 are mounted on the securing nuts 92 for used to loosen the mounting nuts. Threaded bolts 91 are located on a circular ring 99. The threaded bolts 91 and the nuts 92 secure the joints 98 and 99 of the front and back portions of the plane body together. The pneumatic wrench 90 has a rotatable sleeve 93 engaging with the securing nut 92. Compressed air is supplied to the pneumatic wrench 90 through the air conducting tube 94. Bolts 95 are provided for securing a mounting ring 98A on the plane frame 98. As shown in FIG. 37, the size of the mounting ring 98A is equal to the diameter of the plane body. A plurality of pneumatic wrenches equal in number to the number of plane body mounting nuts are provided on this mounting ring. The compressed air ducts 96 are also provided on this mounting ring. The pneumatic wrenches 90 may be activated to loosen all the mounting nuts 92 simultaneously, and after the nuts 92 have been loosened, compressed air is released through four air releasing ports 97 to force apart the now unsecured portions of the plane body. The threaded bolts 91 may be provided on a separate mounting ring 99 in the severable portion of the plane body. As shown in FIG. 41, a compressed air operated separation device 97 is mounted on the mounting ring 98A. It operates to separate the two mounting rings after the securing nuts have been loosened and the mounting bolts have completely been removed. Compressed air is fed to it through the compressed air inlet 101 which is opened by one minute later than the operation of the wrench sleeve 93.

Figure 32A:
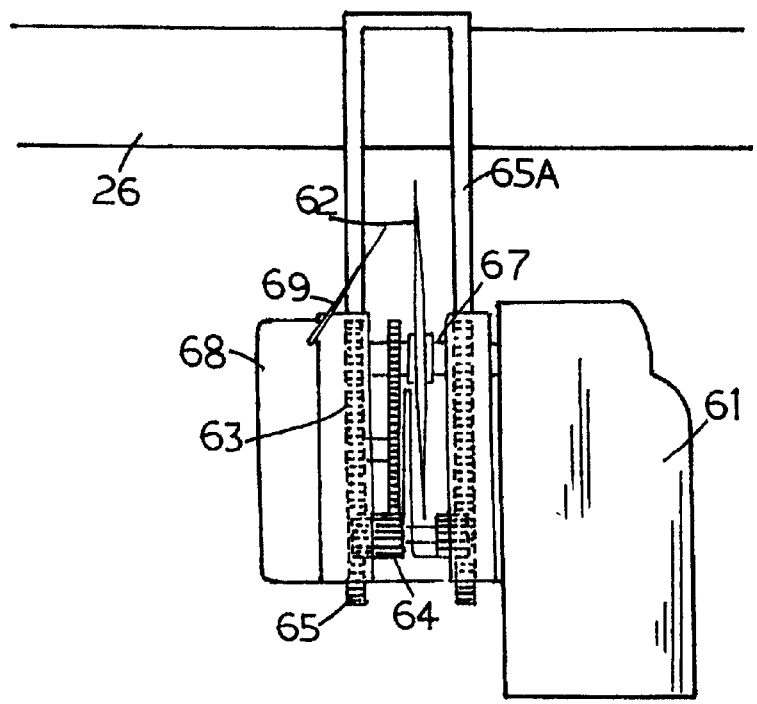
FIG. 32A is a side perspective view of the constant high speed cutting mechanism.
Figure 33A:
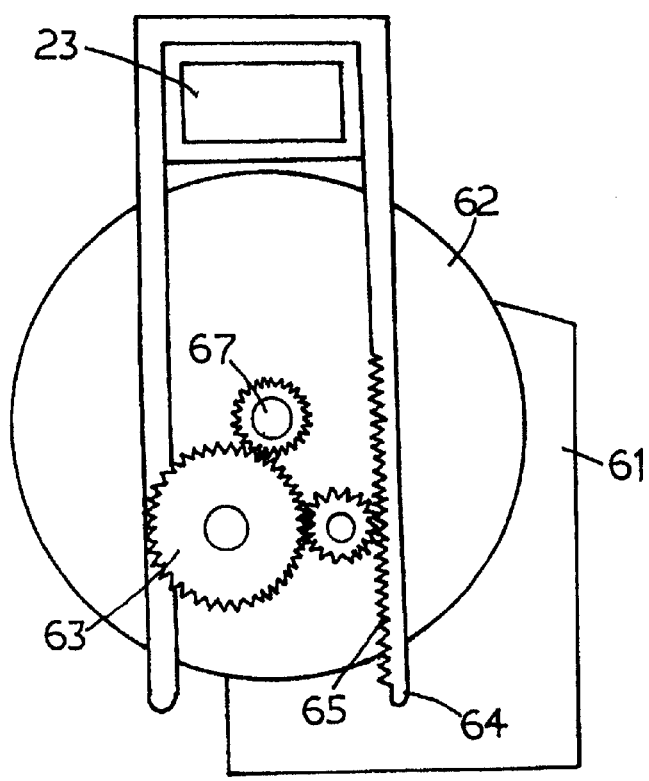
FIG. 33A is a front perspective view of the constant high speed cutting mechanism shown in FIG. 32A.

An alternative embodiment of the cutting mechanism is shown in FIGS. 32A and 33A, which is a constant high speed cutting mechanism for severing the plane body. In this embodiment, a constant high speed cutting mechanism is provided at each selected support in the plane body. When the supports are cut, the thin alloy shell of the plane would naturally break and separate so that the plane body will break up effectively with a greater power into two portions within one to two minutes.

Figure 7A:
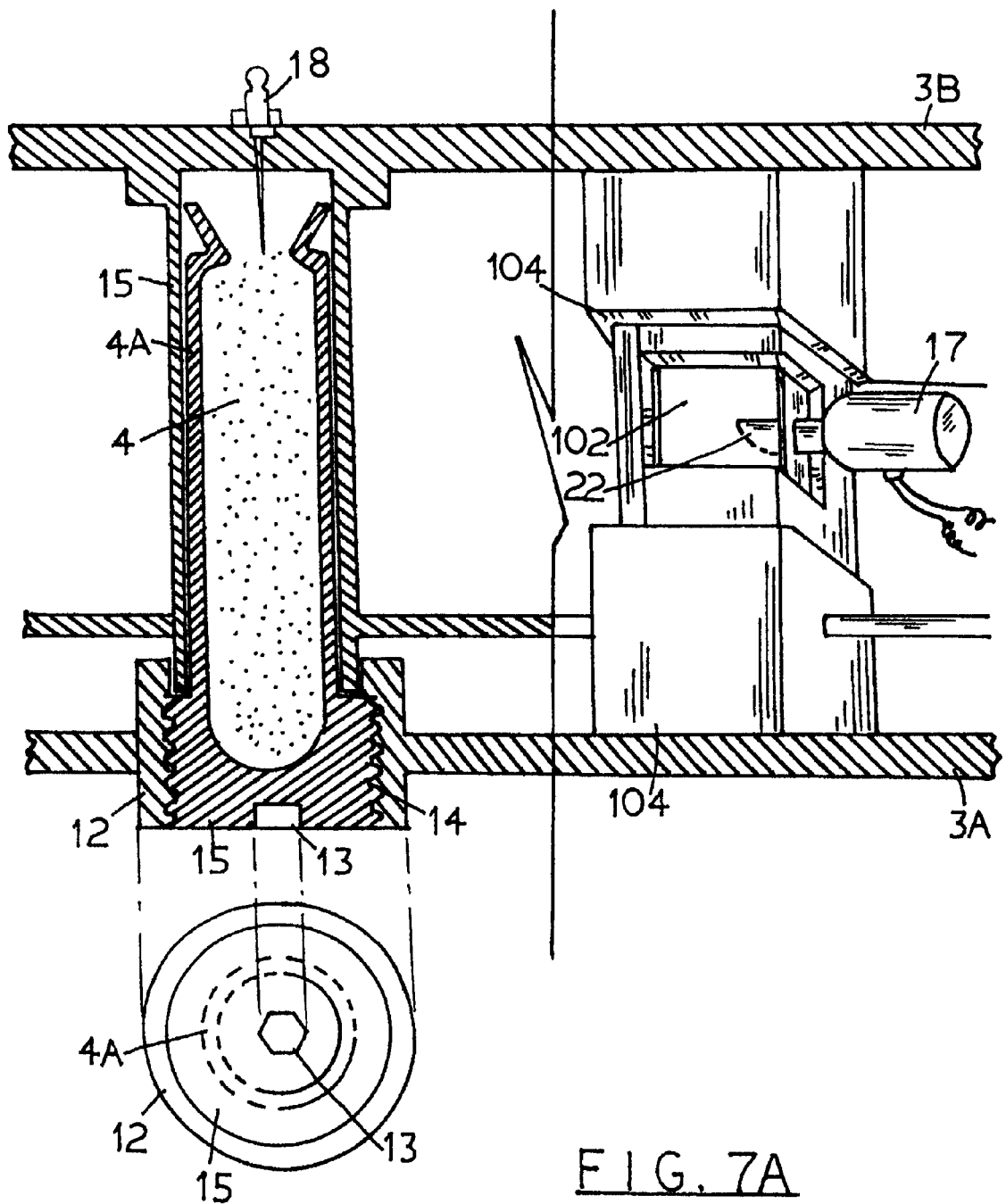
FIG. 7A is an enlarged isolated partial sectional and partial cut view of an alternative embodiment of the latching mechanism in the locking ring.

Another alternative rocket mounting embodiment is shown in FIG. 7A. The difference in this construction is that the rear separable ring 3A has a protruding rod which is inserted into a sleeve in the front separable ring 3B. The plunger of the electromagnetic latch is inserted into a magnetizable sleeve 103. When the firing pin 18 is actuated to fire the rocket, the electrical supply becomes cut off from the sleeve so that the sleeve 103 is no longer magnetized and the electromagnetic latch will then retract to result in the breaking of the plane body.

Another alternative method of severing the plane body is shown in FIGS. 35A and 35B. The entire operation may be accomplished automatically within 1 to 2 minutes. A cutting laser gun 111 is employed for severing the plane body either transversely or longitudinally into two halves quickly and quietly. A laser knife 112 is rotatable through 180 degrees for cutting the plane body at welding points 114 located between the longitudinal supporting rods 26B and 26C. It is only necessary to cut the plane body inside out at several welding points 113 and 114 with the laser knife.

Figure 2A:
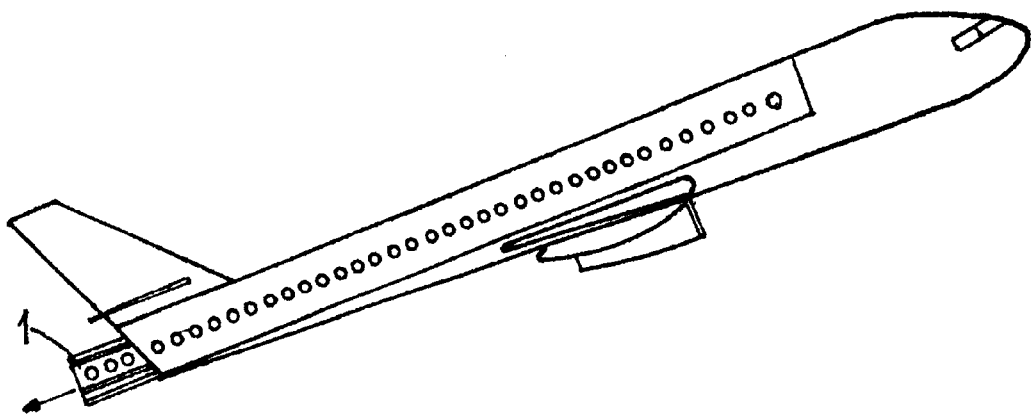
FIG. 2A is a side perspective elevation view showing the provision of an exit door provided at the tail end of the plane for the passenger cabin to exit from the main body shell of the plane.
Figure 2B:
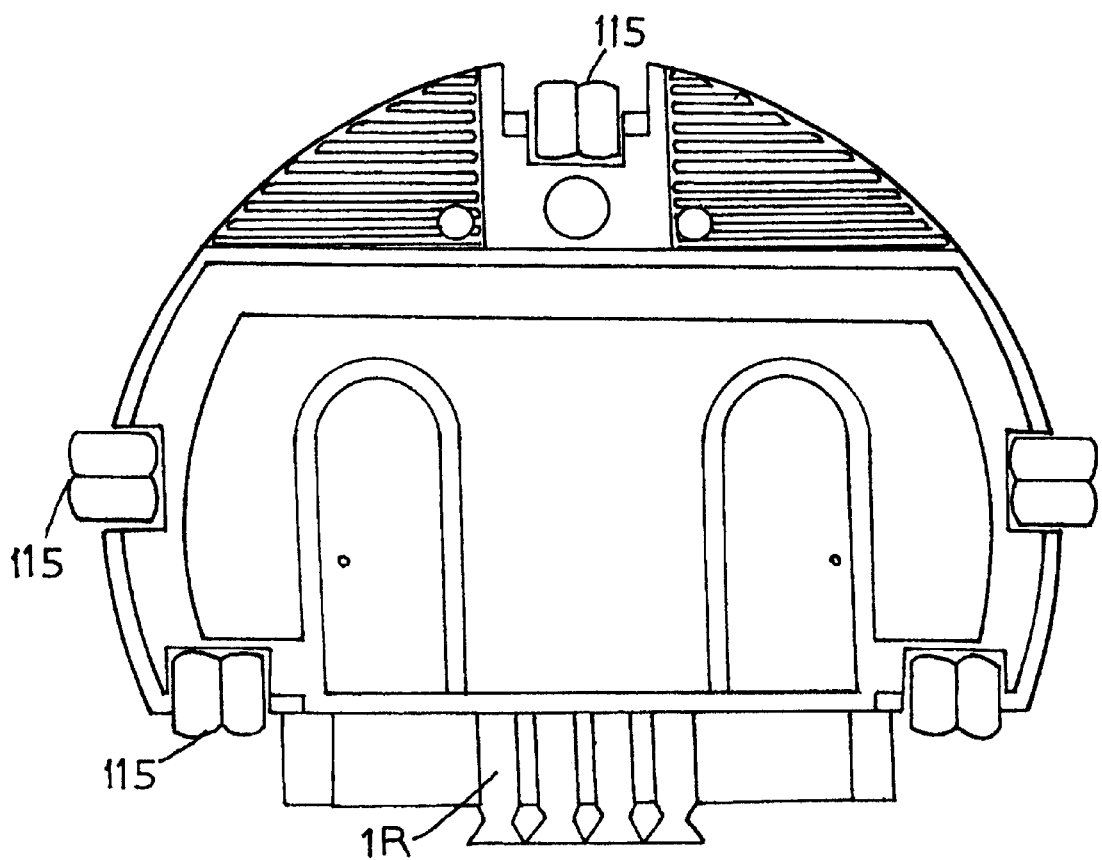
FIG. 2B is an isolated front sectional view showing the alternative locations of the rollers provided on the passenger cabin for facilitating the sliding separation of the passenger cabin from the main body of the plane.

The rollers 115 may be alternatively provided directly on the passenger cabin as shown in FIG. 2B. Furthermore, an exit door may be provided at the rear end of the plane. When the plane is in distress, the pilot would raise the front of the plane and would open the exit door such that all the passenger cabins would automatically slide out of the plane through the now opened back exit door.

A conventional plane may be revised to function according to the present invention by changing its fuselage into an outer protective shell of the plane's main body. One or a plurality of independent carriages are slidably and securely located in tandem in a row within the main body to serve as the passenger cabins. The cabins are independently movable relative to the main body. They share a common control harness but are not coupled together by hitches. Normally the doors of all the passenger cabins are opened to allow people to move about among them. In an emergency, as shown in FIGS. 15, 16 and 17 the doors can be closed and sealed quickly with their air vents closed as shown in FIGS. 18 and 19, and the harness is severed by the specially designed automatic cutting mechanism as shown in FIGS. 20 and 21, so that the passenger cabins may be separated freely from the plane body.

As illustrated in FIG. 2, the passenger cabins located in the plane body must be able to exit the plane body either at the front or the rear of the plane. The chances of exiting from the rear of the plane are normally rare since in an air disaster it is most likely that the uncontrollable plane would descend with its front end pointing downwards.

In the method of severing the body of the plane, by controlled explosion, into two portions at a joint with the provision of a circular separable mounting ring in each portion, six rockets are mounted in the front separable mounting ring 3A of the rear portion. Also, six mounting bars 5 extends from the mounting ring 3B in the rear portion and are inserted into the mounting sleeves 7 provided in the mounting ring 3A of the front portion. As shown in FIG. 7 the mounting sleeves 7 are inserted into the compressed air actuated spring latches 22. The securement of the separable two portions of the plane body may be supplemented by the electromagnetic mounting sleeves as shown in FIG. 7A. The joint between the front and rear portions is located in front the plane engine and the land wheels and fuel tank such that it subjects to only very low stress and it is not affected by small fire which may occur during flight. In an emergency when an air accident occurs and the abandonment of the plane bas been made, the rockets 4 are detonated and they will impact high speed exploding air through duct 19 to release the latches 22 to loosen the frame of the plane body. This chain reaction causes the shell of the plane to break into two portions along the severable joint 24. As described previously, since the landing flaps of the wings have already been locked in the descend position and also with the deployment of the parachute located at the tail end of the plane, the front end of the plane will be pointing downwards such that the plurality of passenger cabins will naturally slide out from the now opened broken front end of the plane. Furthermore, the parachute deployed at the tail end would also greatly reduce the flying speed of the plane body to allow a longer time for the passenger cabins to separate from plane main body. Thus, the survival rate would be increased.

The alternative method as shown in FIG. 28 of breaking the plane body with explosive is even more effective for breaking the plane body along the joint between two mounting rings. In this embodiment, the explosive is located at the supporting bars of the frame of the plane. The explosion of the explosive is confined by the explosion rings 73 shown in FIGS. 23 and 26. The plane body may be broken apart with the immediate detonation of the explosive so that the passenger cabins may separate form the distressed plane body and be suspended by parachutes to land safely onto the ground for saving the lives of the passengers.

In the static embodiment in which laser cutting knives are employed to sever the plane body, the plane body of the distressed plane would break apart automatically in the longitudinal direction. The weld joints of all the circular supporting rings on the left and right sides over the entire length of the plane body are cut to separate it into an upper and lower portions. In this manner, the passenger cabins may fall out of the plane body together with the falling lower portion of the plane body and be subsequently suspended by the parachutes.

In the present design, the plurality of passenger cabins are joined together normally to provide a common function of a single large cabin. However, within a short moment of the occurrence of an accident, the individual passenger cabins are tightly sealed quickly to form separate independent units which may be suspended by parachutes and controlled by the descending speed regulating propulsion jets to land safely onto the ground. The invention provides a logical way of supporting the collective weight of all the passengers such that many lives can be carried and saved.

In case of a forced landing of the plane due to fire, a heat protective shell provided on each passenger cabin would protect the passengers from the heat and smoke under this circumstance. Also, in the meantime, the plane body could be severed as described previously to facilitate access to the source of fire for the fire extinguishing operation.

Wisdom is bred by education and wisdom brings further wisdom, for this reason, I would donate 30% of the profit derived from this invention to the education of gifted students from poor families.

What I claim is:

1. An airplane operative for saving lives of passengers located therein in an air accident, comprising an elongated outer shell forming a main body of said airplane, a plurality of passenger cabins slidably located in a tandem manner in a row within said main body, each one of said passenger cabins being provided with a heat protective shell, self-reliant oxygen supply, heating, deployable parachutes, inflatable rafts, landing speed control propulsion jets, and sealing doors, said sealing doors being operative to seal said each one of passenger cabins into a protective closed unit with passengers located therein, said main body having a rear exit door operative to facilitate separation of said plurality of passenger cabins from said main body, a plurality of rollers provided between said outer shell and said passenger cabins and being operative to enhance said passenger cabins to slide away from said main body if said air accident occurs.

2. An airplane operative for saving lives of passengers located therein in an air accident, comprising elongated outer shell forming a main body of said airplane, a plurality of passenger cabins slidably located in a tandem manner in a row within said main body, each one of said passenger cabins being provided with a heat protective shell, self-reliant oxygen supply, heating, deployable parachutes, inflatable rafts, landing speed control propulsion jets, and sealing doors, said sealing doors being operative to seal said each one of passenger cabins into a protective closed unit with passengers located therein, said main body being separable into a front body portion and a rear body portion at a predetermined breakable location, a first mounting ring mounted to said front body portion and a second mounting ring mounted to said rear body portion, said first mounting ring and second mounting ring being engageable with one another for securing said front body portion and rear body portion together, a plurality of explosive cylinders and mounting sleeves adapted in said first mounting ring and second mounting ring, said explosive cylinders being operative to sever said main body at said breakable location to facilitate said passenger cabins to separate from said main body if said air accident occurs.

3. An airplane according to claim 2 wherein said front body portion and rear body portion are mounted together with a plurality of threaded nuts, a pneumatic wrench is coupled to each one of said threaded nuts and being operative for loosening said nuts for severing said main body into said front body portion and said rear body portion separately.

4. An airplane according to claim 2 including a plurality of electrically operated automatic cutting mechanisms provided at selected frame supports in said main body and adapted to cut said frame supports to sever said main body.

5. An airplane according to claim 2 including a laser cutting member mounted in said main body, said laser cutting member being operative to rotate from 180 degrees to 360 degrees for cutting said main body if said airplane is said air accident.

6. An airplane according to claim 2 including a handle provided on said sealing doors, an explosive cylinder mounted adjacent to said sealing doors and being operative to generate a high speed air for closing said sealing doors to seal said passenger cabins completely to form independent individual units.

7. An airplane according to claim 2 wherein a plurality of electromagnetic sleeves are provided in said first mounting ring and second mounting ring, a plurality of electromagnetic spring latches are provided in said first mounting ring and second mounting ring, said electromagnetic sleeve and said electromagnetic spring latches being engageable with one another to secure said first body portion and second body portion together, said electromagnetic spring latches and electromagnetic sleeves being energizable by an electrical supply, rockets and explosive cylinders located in said main body and be operative to terminate said electrical supply for disengaging said electromagnetic spring latches from electromagnetic sleeves to cause said main body to sever along said breakable location.

8. An airplane according to claim 7 including a braking device provided in each one of said passenger cabins and being operative to control sliding speeds of said cabins to ensure sufficient distances among said cabins to facilitate deployment of said parachutes after said passenger cabins having separated from said main body.

9. An airplane according to claim 8 wherein, upon separation said passenger cabins from said main body, said sealing doors of each passenger cabin are completely shut and oxygen supply, a selected cabin pressure and heating are provided in each separated passenger cabin, and said parachutes and control propulsion jets are operative to facilitate safe landing of said cabins onto the ground, and inflatable floatation rafts are provided on all said passenger cabins and being inflatable automatically if said cabins land on water.

10. An airplane operative for saving lives of passengers located therein in an air accident, comprising an outer shell forming a main body of said airplane, said outer shell being severable at a predetermined breakable location to provide an exit opening in said main body, a plurality of passenger cabins units slidably located within said outer shell, said passenger cabin units being structurally independent form said outer shell and being provided with individual oxygen supply, heating and sealing doors, said sealing doors being operative to shut quickly in said accident to seal said passenger cabin units into individual operative survival units separable from said main body by exiting slidably out through said exit opening, parachutes mounted on said survival units and being deployable to suspend said survival units in air after said survival units having separated from said main body, reverse speed control propulsion jets mounted on said survival units and being operative to control said survival units'descending speed in air, inflatable floatation rafts provided on said survival units and being inflated automatically to support said survival unit if said survival units land on water.

11. An airplane according to claim 10 wherein said parachutes are mounted to said passenger cabins and main plane body through a shock absorbing device operative for reducing any sudden pulling force imposed on said passenger cabins and main plane body upon deployment of said parachutes.

* * * * *